(12) United States Patent
Mäki et al.

(10) Patent No.: US 8,501,253 B2
(45) Date of Patent: Aug. 6, 2013

(54) CARNALLITE-LIKE FOOD SALTS AND PRODUCTS THEREOF

(75) Inventors: Juhani Mäki, Kaivanto (FI); Tapio Mäki, San Diego, CA (US)

(73) Assignee: Smart Salt, Inc., Arnold, CA (US)

(*) Notice: Subject to any disclaimer, the term of this patent is extended or adjusted under 35 U.S.C. 154(b) by 212 days.

(21) Appl. No.: 12/933,871

(22) PCT Filed: Mar. 20, 2009

(86) PCT No.: PCT/US2009/037877
§ 371 (c)(1),
(2), (4) Date: Dec. 7, 2010

(87) PCT Pub. No.: WO2009/117702
PCT Pub. Date: Sep. 24, 2009

(65) Prior Publication Data
US 2011/0064853 A1   Mar. 17, 2011

Related U.S. Application Data

(60) Provisional application No. 61/038,706, filed on Mar. 21, 2008.

(51) Int. Cl.
*A23L 1/237* (2006.01)

(52) U.S. Cl.
USPC ............................ 426/74; 426/520; 426/649

(58) Field of Classification Search
USPC .......................................... 426/74, 649, 520
See application file for complete search history.

(56) References Cited

U.S. PATENT DOCUMENTS

| | | | | |
|---|---|---|---|---|
| 1,875,013 | A | * | 8/1932 | Kaselitz ........................ 423/463 |
| 3,312,607 | A | * | 4/1967 | Goodenough et al. ........ 205/405 |
| 3,337,432 | A | | 8/1967 | Belski |
| 3,798,314 | A | | 3/1974 | Suzukawa |
| 3,860,732 | A | | 1/1975 | Eisenstadt |
| 6,787,169 | B1 | * | 9/2004 | Maki ................................ 426/72 |
| 2008/0025908 | A1 | | 1/2008 | Chu et al. |

FOREIGN PATENT DOCUMENTS

| | | |
|---|---|---|
| GB | 1308084 | 2/1973 |
| WO | WO-00-44245 | 8/2000 |
| WO | WO 01/83401 A1 | 11/2001 |

* cited by examiner

*Primary Examiner* — Helen F Heggestad
(74) *Attorney, Agent, or Firm* — Wilson, Sonsini, Goodrich & Rosati

(57) ABSTRACT

Provided herein are salts for use in food products having the formula: $MgCl_2 \cdot xKCl \cdot yNH_4Cl \cdot zH_2O$, wherein x+y is about 1, wherein x is greater than or equal to zero and less than 1, wherein y is greater than zero and less than or equal to 1, and wherein z is from about 4 to about 6.

17 Claims, 6 Drawing Sheets

CARNALLITE-LIKE FOOD SALTS AND PRODUCTS THEREOF

RELATED APPLICATIONS

This patent application claims the benefit of U.S. Provisional Application Ser. No. 61/038,706, filed Mar. 21, 2008, and UK Application 0820056.0 filed Oct. 31, 2008, both of which are herein incorporated by reference in their entirety.

BACKGROUND

Sodium-based salts are used in a variety of food products. For example, sodium chloride, also known as table salt, is commonly used in food. However, excess consumption of sodium chloride has been linked to high blood pressure (hypertension).

SUMMARY OF THE INVENTION

Described herein are food salts and food salt products. The food salts and food salt products have a superior taste and also provide an enhanced taste to other types of spices. The food salts and food salt products also have superior properties for the preservation of foods. In addition, the food salts and food salt products achieve the aforementioned results with lower, or little, or no sodium as compared to sodium chloride. As a result, the food salt products are a healthy alternative to sodium chloride. In some embodiments, the food salts and food salt products taste like sodium chloride, season like sodium chloride, and/or bake and cook like sodium chloride. In some embodiments, the food salts and food salt products described herein have no carbon-based ingredients.

Provided herein are substantially non-hygroscopic salts for use in a food products having the formula:

$$MgK_x(Na_4)_yCl_g \cdot zH_2O \qquad \text{Formula III}$$

wherein the sum of x and y is about 1, wherein $0 \leq x < 1$, wherein $0 < y \leq 1$, wherein g is about 3, wherein z is about 4-6, and wherein the salt for use in a food product is substantially non-hygroscopic and substantially free of hydrogen chloride.

In some embodiments, provided herein is a substantially non-hygroscopic salt for use in a food product having the formula:

$$MgK_x(NH_4)_yCl_g \cdot zH_2O \qquad \text{Formula III}$$

wherein the sum of x and y is about 1, wherein x is about 0.05 to about 0.45, wherein y is about 0.55 to about 0.95, wherein g is about 3, wherein z is about 4-6, and wherein the salt for use in a food product is substantially non-hygroscopic and substantially free of hydrogen chloride.

In some embodiments, z is 6.

Described herein are carnallite salts that are suitable for use as salts in food products. The salts are substantially non-hygroscopic and substantially free of hydrochloric acid and/or free ammonium chloride and are suitable replacements for sodium-based salts in a variety of food products.

In some embodiments, the salts for use in food products described herein are prepared by
a) dissolving in or wetting with an aqueous medium (i) magnesium chloride, and (ii) ammonium chloride, potassium chloride or a combination thereof;
b) boiling the aqueous medium; and
c) removing the aqueous medium by evaporation to afford the salt for use in a food product;
wherein the molar ratio of magnesium chloride to potassium chloride to ammonium chloride is 1:x:y.

In some embodiments, the salts for use in food product described herein are prepared by:
a) dissolving in or wetting with an aqueous medium (i) magnesium chloride, (ii) ammonium chloride, potassium chloride or a combination thereof, and (iii) an acid scavenger;
b) boiling the aqueous medium;
c) precipitating the salt for use in a food product from the aqueous medium;
d) filtering the precipitated salt for use in a food product; and
e) optionally recycling the filtrate;
wherein the molar ratio of magnesium chloride to potassium chloride to ammonium chloride is 1:x:y.

In some embodiments, the salt for use in a food product is prepared by a filtration process, a semi-dry filtration process, a spray drying process, a bulk process or a drum dryer process.

In some embodiments, the salts for use in a food product are prepared by dissolving in or wetting with the aqueous medium an additional amount of about 1-10 mol % of ammonium chloride. In some embodiments, the salts for use in a food product are prepared by dissolving in or wetting with the aqueous medium an additional amount of about 2 mol % of ammonium chloride.

In some embodiments of the salts, x is about 0.25 and y is about 0.75.

In some embodiments, provided herein is a particle comprising a core and at least one layer, wherein the core comprises a salt described herein and wherein at least one layer of the particle comprises sodium chloride, potassium chloride, or a combination thereof.

Also provided herein is a composition comprising (i) a salt for use in a food product described herein and (ii) sodium chloride, potassium chloride, or a combination thereof.

In some embodiments, the composition comprises (i) a salt for use in a food product described herein and (ii) an aqueous medium, wherein the salt for use in a food product is dissolved and dissociated in the aqueous medium.

In some embodiments, an aqueous solution is prepared by dissolving a salt for use in a food product described herein in potable water. In some embodiments, the aqueous solution comprises magnesium cations, potassium cations and ammonium cations in a molar ratio of 1:x:y. In some embodiments, the aqueous solution is prepared by further dissolving sodium chloride and potassium chloride in the aqueous medium. In some embodiments, the aqueous solution comprises sodium cations, potassium cations, magnesium cations, and ammonium cations, wherein the molar ratio of sodium cations to potassium cations is from 1:0.005 to 1:0.5, the molar ratio of sodium cations to magnesium cations is from 1:0.005 to 1:0.1, and wherein the molar ratio of sodium cations to ammonium cations is from 1:0 to 1:0.1.

Also provided herein is a nutrient substance, a semi-finished food product, a flavoring product, a processed food product that has, during the preparation thereof, been processed or preserved with a salt for use in a food product described herein, a composition described herein, or a solution described herein.

In some embodiments, the nutrient substance, semi-finished food product, or processed food product is selected from meats, fish, vegetables, snack foods, soups, sauces, dairy products, and yeast based products.

Also provided herein is a method of decreasing the sodium content of a food product by at least partially substituting a sodium containing salt in the food product with a salt for use in a food product described herein, a composition of described herein, or a solution described herein.

In some embodiments, a food product containing a salt described herein does not have a substantially decreased taste or shelf-life.

Further provided herein is a method of preparing a substantially non-hygroscopic salt for use in a food product having the formula:

$$MgK_x(NH_4)_yCl_g \cdot zH_2O \qquad \text{Formula III}$$

comprising:
a) dissolving in or wetting with an aqueous medium (i) magnesium chloride, and (ii) ammonium chloride, potassium chloride or a combination thereof; and
b) removing the aqueous medium by evaporation to afford the salt for use in a food product;
wherein the stun of x and y is about 1, wherein $0 \leq x < 1$, wherein $0 < y \leq 1$, wherein g is about 3, wherein z is about 4-6, and wherein the molar ratio of magnesium chloride to potassium chloride to ammonium chloride is 1:x:y.

In some embodiments, the sum of x and y is about 1, x is about 0.05 to about 0.45, y is about 0.5 to about 0.95, g is about 3, z is about 4-6, and the molar ratio of magnesium chloride to potassium chloride to ammonium chloride is 1:x:y.

In some embodiments, step (b) further comprises dissolving in or wetting with the aqueous medium an additional about 1-10 mol % of ammonium chloride. In some embodiments, the method further comprises dissolving in or wetting with the aqueous medium an additional about 2 mol % of ammonium chloride.

Also provided herein is a method of preparing a substantially non-hygroscopic salt for use in a food product having the formula:

$$MgK_x(NH_4)_yCl_g \cdot zH_2O \qquad \text{Formula III}$$

comprising:
a) dissolving in or wetting with an aqueous medium (i) magnesium chloride, (ii) ammonium chloride, potassium chloride or a combination thereof, and (iii) an acid scavenger;
b) removing the aqueous medium by evaporation to afford the salt for use in a food product;
wherein the sum of x and y is about 1, wherein $0 \leq x < 1$, wherein $0 < y \leq 1$, wherein g is about 3, wherein z is about 4-6, and wherein the molar ratio of magnesium chloride to potassium chloride to ammonium chloride is 1:x:y.

In some embodiments of the method x is about 0.05 to about 0.45, y is about 0.5 to about 0.95, g is about 3, z is about 4-6, and the molar ratio of magnesium chloride to potassium chloride to ammonium chloride is about 1:x:y.

In some embodiments, removing the aqueous medium by evaporation comprises boiling the aqueous medium.

Provided herein is a method of preparing a salt for use in a food product having the formula:

$$MgK_x(NH_4)_yCl_g \cdot zH_2O \qquad \text{Formula III}$$

comprising:
a) dissolving in or wetting with an aqueous medium (i) magnesium chloride, (ii) ammonium chloride, potassium chloride or a combination thereof, and (iii) an acid scavenger,
b) precipitating the salt for use in a food product from the aqueous medium;
d) filtering the precipitate; and
e) optionally recycling the filtrate;

wherein the sum of x and y is about 1, wherein $0 \leq x < 1$, wherein $0 < y \leq 1$, wherein g is about 3, wherein z is about 4-6, and wherein the molar ratio of magnesium chloride to potassium chloride to ammonium chloride is 1:x:y.

In some embodiments of the method, the sum of x and y is about 1, x is about 0.05 to about 0.45, y is about 0.5 to about 0.95, wherein g is about 3, z is about 4-6, and the molar ratio of magnesium chloride to potassium chloride to ammonium chloride is 1:x:y.

In some embodiments, step (b) further comprises dissolving in or wetting with the aqueous medium an additional amount of about 1-10 mol % of ammonium chloride. In some embodiments, step (b) further comprises dissolving in or wetting with the aqueous medium an additional amount of about 2 mol % of ammonium chloride.

In some embodiments, the salt is prepared by a filtration process, a semi-dry filtration process, a spray drying process, a bulk process or a drum dryer process.

Provided herein is a substantially non-hygroscopic salt for use in a food product having the formula:

$$MgK_x(NH_4)_yCl_g \cdot zH_2O \qquad \text{Formula III}$$

wherein the sum of x and y is about 1, wherein $0 \leq x < 1$, wherein $0 < y \leq 1$, wherein g is about 3, and wherein z is about 4-6; wherein less than about 5% of the K ions in the salt for use in a food product are optionally substituted with a physiologically acceptable cation; wherein less than about 5% of the $NH_4$ ions in the salt for use in a food product are optionally substituted with a physiologically acceptable cation; wherein less than about 5% of the Cl ions in the salt for use in a food product are optionally substituted with a physiologically acceptable anion, and wherein the salt for use in a food product is substantially non-hygroscopic.

In some embodiments, the physiologically acceptable cation is selected from calcium, zinc, selenium, copper, cobalt, chromium, manganese, molybdenum and combinations thereof. In some embodiments, the physiologically acceptable anion is selected from fluoride, iodide, phosphate, silicate, selenate, sulfate, nitrite and combinations thereof.

Also provided herein is a substantially non-hygroscopic salt for use in a food product having the formula:

$$MgK_x(NH_4)_yCl_g \cdot zH_2O \qquad \text{Formula III}$$

wherein the sum of x and y is about 1, wherein x is about 0.05 to about 0.45, wherein y is about 0.5 to about 0.95, wherein g is about 3, wherein z is about 4-6; wherein less than about 5% of the K ions in the salt for use in a food product are optionally substituted with a physiologically acceptable cation; wherein less than about 5% of the $NH_4$ ions in the salt for use in a food product are optionally substituted with a physiologically acceptable cation; wherein less than about 5% of the Cl ions in the salt for use in a food product are optionally substituted with a physiologically acceptable anion, and wherein the salt for use in a food product is substantially non-hygroscopic.

In some embodiments, the physiologically acceptable cation is selected from calcium, zinc, selenium, copper, cobalt, chromium, manganese, molybdenum and combinations thereof. In some embodiments, the physiologically acceptable anion is selected from fluoride, iodide, phosphate, silicate, selenate, sulfate, nitrite and combinations thereof.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
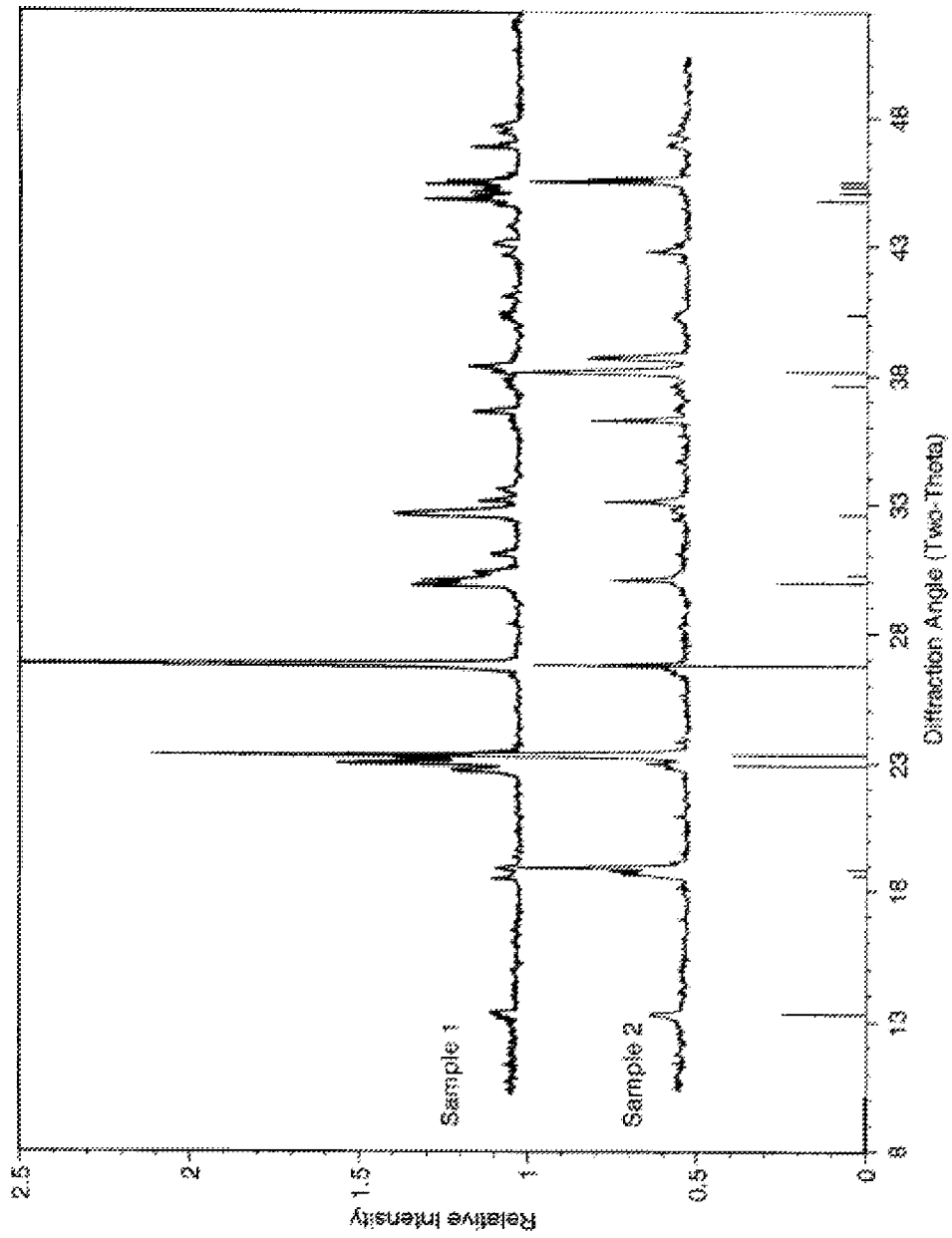
FIG. 1 illustrates the powder X-Ray Diffraction (XRD) pattern for a salt product having the formula $MgCl_2 \cdot xKCl \cdot yNH_4Cl \cdot zH_2O$, wherein x is about 0.25, y is about 0.75 and z is about 6, with a stick pattern reference for $NH_4MgCl_3 \cdot 6H_2O$.

Sodium salts, e.g., sodium chloride, have a harmful effect on human health. Diets comprising high levels of sodium lead to morbidity in arterial hypertension and mortality in myocardial infarction. Conversely, magnesium salts reduce blood pressure and ammonium salts serve as preservatives that slow the growth of bacteria in food materials and products. Moreover, ammonium is a normal metabolic product in the metabolism of nitrogen containing compounds, such as protein. Excess physiological ammonium is captured by carbon dioxide and converted into urea, which is excreted from the body in the form of urine. Thus, magnesium and ammonium salts can serve as suitable substitutes in sodium-salt preparations if requirements related to taste, nutritional properties and ease of manufacturing and/or processing are met.

Preferably, sodium-salt substitutes are chloride salts. Other salts such as sulfate, carbonate and/or phosphate salts have limited utility in sodium-salt substitutes because of their bitter taste and/or limited solubility. Chloride salts of alkali metals (e.g., potassium) and/or alkaline earth metals (e.g., magnesium, calcium) are physiologically acceptable substitutes for sodium-based salts; but such chloride salts are limited by being unduly hygroscopic which limits their utility as food salts. Moreover, when the salts are dried, hydrochloric acid is released from the product and/or by other acidic components which leads to an unpleasant (e.g., metallic or bitter) taste or lingering after-taste.

Carnallite is a naturally occurring double salt mineral comprising alkali metal chlorides (e.g., potassium chloride) and alkaline earth metal chlorides (e.g., magnesium chloride). In some instances, a carnallite salt is an ammonium carnallite, e.g., a triple salt comprising potassium chloride, magnesium chloride and ammonium chloride. The presence of physiologically acceptable salts in carnallite and carnallite-type salts makes them good candidates for food salt substitutes. U.S. Pat. Nos. 3,312,607, and 3,337,432, describe industrial applications of ammonium carnallite salts (e.g., as cell feed in magnesium cells). However, salts prepared by methods of preparation described therein are not described as suitable for human consumption. Generally such industrial salts are not used in food products or human consumption. U.S. Pat. Nos. 3,323,875, 3,536,444, 3,798,314, U.S. Patent Appl. No. 2008/0025908, GB 1308084, GB 1219969 and GB1130183 describe industrial applications of carnallite double salts (e.g., salts comprising magnesium and potassium chlorides, or magnesium and ammonium chlorides), for example, in recovery of magnesium salts from brines. None of these references describes physiological compatibility of carnallite salts or the applicability of carnallite salts as food salts. WO 00/44245 does not specifically describe stability, hygroscopicity or hydrochloric acid content of salts described therein.

Accordingly, provided herein are food salts for use in food products comprising magnesium chloride, potassium chloride and ammonium chloride that are suitable substitutes for sodium-based food salts. Substitution of sodium-based salts with the salts describe herein provides food products with reduced levels of sodium. In some instances, the salts described herein serve as complete or partial replacements for sodium-based salts in food products and provide low sodium products. Furthermore, in certain embodiments, the salt products and salts provided herein possess good preservative characteristics, good physical properties (e.g., ability to sprinkle or pour even under damp or humid conditions) and/or good flavor. In certain instances, the salts for use in food products described herein are palatable with no discernible difference in taste compared to conventional sodium-based salts and are suitable for use in a variety of food products described herein. In some instances, food salts described herein are substantially non-hygroscopic, substantially free of hydrochloric acid and/or free ammonium chloride, and have a pleasant taste.

In some embodiments, food salts described herein are prepared by novel methods that provide salts that are suitable for human consumption. The methods of preparation described herein allow for ease of manufacturing via a cost-effective process and provide free flowing non-hygroscopic salts that are substantially free of hydrochloric acid and/or free ammonium chloride.

In some embodiments, the food salts described herein are prepared by the dissolution or wetting of the salt components (e.g., potassium chloride, ammonium chloride, magnesium chloride, calcium chloride) in an aqueous medium. In some instances, the presence of dissolved ammonium chloride results in a solution pH-value of 5.0-5.5. In certain instances, ammonium chloride breaks down to ammonia and hydrogen chloride in the presence of concentrated solutions comprising magnesium chloride. In certain conventional dissolving and cooling methods of preparation, the released hydrogen chloride is occluded in the formed crystal lattice and the food salt product has sharp taste with reduced stability (i.e., the product is hygroscopic).

In certain instances, aqueous solutions prepared according to processes described herein are subjected to heat and/or reduced pressure to exhaust the hydrogen chloride and obtain a food salt product that is substantially free of HCl and substantially non-hygroscopic. In some instances, subjecting the aqueous solutions prepared according to processes described to heat and/or reduced pressure leads to hydrolyzation of ammonium chloride (e.g., in some instances about 1-10% of the ammonium chloride is hydrolyzed). In some embodiments, an additional amount of ammonium chloride (e.g. about 1-10% molar excess) is added to an aqueous mixture that has been subjected to heat and/or reduced pressure. In some instances, addition of excess ammonium chloride provides a salt, in a subsequent step described herein, wherein there is no hydrogen chloride occluded in the crystal lattice and wherein the stoichiometry of ammonium chloride is such that there is no free ammonium chloride left outside the crystal lattice of the salt product. The addition of about 1-10% molar excess of ammonium chloride to an aqueous solution prepared according to processes described herein, that is subjected to heat and/or reduced pressure, represents an advance over prior art as this method of producing carnallite salts that are substantially free of hydrogen chloride and ammonium chloride has not been disclosed in prior art. Ammonium carnallite salts prepared by the methods described herein have improved Critical Relative Humidity values and are stable even in humid conditions (e.g., 70% humidity).

In some embodiments, methods of preparation of carnallite salts described herein are also applicable to the preparation of naturally occurring carnallite (i.e., a magnesium chloride, potassium chloride double salt). Addition of a 1-10% molar excess of $NH_4Cl$ to an aqueous solution of magnesium chloride and potassium chloride prepared according to processes described herein and subjecting the aqueous solution to heat and/or reduce pressure affords, in a subsequent step described herein, salt products that are suitable for human consumption and have improved stability in atmospheric humidity. Such natural carnallite salts that are substantially free of hydrogen chloride and are substantially non-hygroscopic are of value when ammonium-free food salts are desired.

Provided herein are non-sodium salts, low sodium salt compositions and/or low sodium food products. In certain embodiments, provided herein are salts comprising (i) magnesium cations, (ii) potassium cations, ammonium cations, or combinations thereof, and (iii) chloride. In further embodiments, the salts provided herein are hydrates. Further provided herein are low or no sodium salt compositions and food products comprising (i) magnesium cations, (ii) potassium cations, ammonium cations, or combinations thereof, and (iii) chloride.

Food Salts for Use in Food Products

Provided herein is a salt for use in a food product having the Formula I:

$$MgCl2.xKCl.yNH4.zH2O \qquad \text{Formula I}$$

In certain embodiments, the sum of the terms x and y is about 1. In further or alternative embodiments, the term x is greater than or equal to zero and less than 1. In further or alternative embodiments, the term y is greater than zero and less than or equal to 1. In further or alternative embodiments, the term z is about 4 to about 6. In specific embodiments, the term z is about 6. In certain embodiments, the term y is greater than 0. In further or alternative embodiments, x is greater than 0. In some embodiments, the term x is about 0.05 to about 0.45, about 0.1 to about 0.4, about 0.1 to about 0.3, about 0.2 to about 0.3, about 0.25, about 0.55 to about 0.95, about 0.6 to about 0.9, about 0.7 to about 0.8, or about 0.75. In certain embodiments, the term y is about 0.05 to about 0.45, about 0.1 to about 0.4, about 0.1 to about 0.3, about 0.2 to about 0.3, about 0.25, about 0.55 to about 0.95, about 0.6 to about 0.9, about 0.7 to about 0.8, about 0.75. In specific embodiments, the term x is about 0.25 and the term y is about 0.75. In more specific embodiments, provided herein is a salt wherein x is about 0.25, y is about 0.75 and the XRD pattern of the salt comprises any one or more peaks with a 2θ value about that of the peaks set forth in Sample 1 or Sample 2 of FIG. 1. In certain embodiments, the term x is from about 0.05 to about 0.045 and the term y is from about 0.55 to about 0.95. In other specific embodiments, the term x is about 0.75 and the term y is about 0.25. In still other specific embodiments, the term x is about 0.5 and the term y is about 0.5.

Salts for use in a food product of Formula I, wherein x+y=1, can also be written as Formula II, wherein x, y and z are as defined above:

$$MgKx(NH4)yCl3.zH2O \qquad \text{Formula II}$$

In certain embodiments, in any of the food salts or other compositions described herein, a small portion of the chloride anions are substituted with another anion, e.g., a physiologically acceptable anion. In certain amounts, anions such as, by way of non-limiting example, fluoride, iodide, phosphate, silicate, selenate, sulfate, nitrite, combinations thereof, and the like are physiologically acceptable. In certain embodiments, a physiologically acceptable amount, less than 5%, less than 3%, less than 2%, less than 1%, less than 0.5%, less than 0.1%, or less than 0.01% of the chloride anions are substituted with a physiologically acceptable anion. In certain embodiments, the salt product is formulated such that less than 100 mg per day of selenium (e.g., from selenate and other sources) is consumed. Accordingly, in certain embodiments, provided herein are salts for use in a food product of Formula III:

$$MgKx(NH4)yClg.zH2O \qquad \text{Formula III}$$

In certain embodiments, the terms x, y and z are as defined above. In some embodiments, the term g is from about 2.9 to about 3. In specific embodiments, the term g is about 3.

Similarly, in certain embodiments, provided herein are salt products wherein a portion of the potassium and/or ammonium cations are replaced with other physiologically acceptable cations. In certain embodiments, the physiologically acceptable cations are selected from, by way of non-limiting example, calcium, zinc, selenium, copper, cobalt, chromium, manganese, molybdenum and combinations thereof. In certain embodiments, a physiologically acceptable amount, less than 10%, less than 5%, less than 3%, less than 2%, less than 1%, less than 0.5%, less than 0.1%, or less than 0.01% of the potassium and/or ammonium cations are substituted with a physiologically acceptable cation.

Thus, in certain embodiments, provided herein is a salt for use in a food product of Formula IV:

$$MgMfKx(NH4)yClgXh.zH2O \qquad \text{Formula IV}$$

In certain embodiments, M is a physiologically acceptable cation and the sum of f*(the charge of M), x and y is about 1. For example, in certain embodiments, M is $Ca^{2+}$ and in such instances, the sum of 2f, x and y is about 1. In certain embodiments term f is from 0 to about 0.1, from 0 to about 0.05, or from about 0.01 to about 0.05. In some embodiments, X is a physiologically acceptable anion and the term h is equal to about 3-g. In certain embodiments term h is from 0 to about 0.2, from 0 to about 0.05, or from about 0.01 to about 0.05. In specific embodiments, f is from about 0.01 to about 0.1 and h is zero. In alternative embodiments, h is from about 0.01 to about 0.2 and f is zero. The terms x, y, g and z are as described herein above.

In certain embodiments, any of the salt products of Formulas I-IV comprises one or more of the following: (i) a magnesium chloride and potassium chloride double salt; (ii) a magnesium chloride and ammonium chloride double salt; and (iii) a magnesium chloride, potassium chloride and ammonium chloride triple salt. In further embodiments, the salt products of either of Formulas III-IV further comprises a double salt of zinc chloride and ammonium chloride.

In specific embodiments, zinc is present in either of Formulas III or W as a cation substitute of magnesium in an amount such that less than 15 mg per day of zinc is consumed by an individual. In certain embodiments, the salt product is formulated such that less than 250 μg, or less than 100 μg per day of selenium (e.g., from selenium cations and/or selenate anion sources) is consumed by an individual.

Furthermore, in certain embodiments, the salt products described herein comprise less than a detectable amount (e.g., by taste), less than 3%, less than 1%, less than 0.5%, or less than 0.1% by weight of $NH_4Cl$ free from (i.e., outside the lattice of) a magnesium chloride and ammonium chloride double salt and/or a magnesium chloride, potassium chloride and ammonium chloride triple salt. Furthermore, in certain embodiments, the salt products described herein comprise less than a detectable amount (e.g., by smell or taste), less than 3%, less than 1%, less than 0.5%, less than 0.1%, or less than 0.01% by weight of HCl.

In certain embodiments, the salt for use in a food product of any of Formulas I-IV is substantially non-hygroscopic. In one embodiment, such salt product adsorbs less than 1 wt-% per month upon extended storage in the absence of a dessicant. In certain embodiments, the salt product described herein has a critical relative humidity value of greater than 70%, greater than 75%, greater than 80%, or about 75% to about 80% at 30° C. In certain instances, a salt product of Formula I has a CRH value of about 70% at 30° C., e.g., wherein x is zero and y is one.

It is to be understood that as used herein, any numerical value, whether described exactly or as about that numerical value, includes the disclosure of about that amount and exactly that amount. Thus, the disclosure of less than about 3% includes the disclosure of less than 3% and the disclosure of less than 3% includes the disclosure of less than about 3%.

In certain embodiments, any of the salt products of Formulas I-IV is a food salt, an edible salt, a physiologically acceptable food salt, or the like. In preferred embodiments, the salt product is non-toxic. In certain embodiments, any of the salt products of Formulas I-IV is suitable for use in any food product described herein.

The term "food salt" represents a salt (e.g., any salt described herein) suitable for use in or with food products. A food salt is suitable for human consumption. A food salt has no toxicity, or a reduced toxicity, when used in amounts that are similar to amounts of sodium chloride or sodium-based salts. A food salt is a free flowing non-hygroscopic salt that is substantially free of hydrogen chloride. A food salt is also substantially free of free ammonium chloride. The food salts or salts for use in food products described herein are pleasant tasting palatable salts (i.e., there is no discernible difference between the taste of the salts described herein and sodium chloride and/or sodium-based salts) and do not have a metallic taste or after-taste.

Process of Making

In various embodiments, the salts for use in a food product described herein are prepared in any manner. In specific embodiments, a processes described herein is utilized to prepare a salt product of any of Formulas I-IV. In more specific embodiments, a process described herein is utilized to prepare a non-hygroscopic salt product of any of Formulas I-IV.

In certain embodiments, a salt product of any of Formulas I-IV is prepared by:

a. dissolving in or wetting with an aqueous medium:
    i. magnesium chloride, and
    ii. ammonium chloride, potassium chloride or a combination thereof;
  b. removing the aqueous medium by evaporation to afford the salt.

In some embodiments, the molar ratio of chlorides dissolved in the aqueous medium is 1 part magnesium chloride to x parts potassium chloride to y parts ammonium chloride. In some instances, the aqueous medium is removed by evaporation (e.g., by boiling and/or otherwise removing by heat and/or reduced pressure). In some instances, boiling leads to hydrolysis of a small mole percent ($\leq 10\%$) of ammonium chloride. In some embodiments, a slight molar excess of ammonium chloride is added to the aqueous medium when the aqueous medium is subjected to boiling and/or heat and/or reduced pressure. In some embodiments, the molar excess of ammonium chloride added to the aqueous medium is from about 1-10 mole %. In some specific embodiments, the molar excess of ammonium chloride added to the aqueous medium is from about 1-5 mole %. In some specific embodiments, the molar excess of ammonium chloride added to the aqueous medium is about 2 mole %. In some embodiments, the molar excess of ammonium chloride is added prior to boiling the aqueous solution, e.g., prior to heating the aqueous solution, or when the temperature of the aqueous solution is about 35° C., about 45° C., about 55° C., about 65° C., about 75° C., about 85° C., or about 95° C.

In some embodiments, the molar ratio of magnesium chloride to ammonium chloride utilized in the process is from about 1:1.01y to about 1:1.1y. In certain embodiments, the molar ratio of magnesium chloride to potassium chloride to ammonium chloride utilized in the process is about 1:x:>y, about 1:x:y, or from about 1:x:1.01y to about 1:x:1.1y. In certain embodiments, the molar ratio of magnesium chloride to potassium chloride to ammonium chloride is from about 1:x:1.01y to about 1:x:1.05y. In more specific embodiments, the molar ratio of magnesium chloride to potassium chloride to ammonium chloride is about 1:x:1.02y. Thus, for example, wherein the salt prepared hereby is $MgCl_2 \cdot (KCl)_{0.5} \cdot (NH_4Cl)_{0.5} \cdot zH_2O$ (i.e., wherein x=y=0.5), the molar ratio of magnesium chloride to potassium chloride to ammonium chloride utilized in the process is about 1:0.5:0.51.

In certain embodiments, the aqueous medium of any process described herein is removed/evaporated by reduced pressure and/or increased temperature. In specific embodiments, the aqueous medium is removed/concentrated by heating aqueous medium to a boil (e.g., to at least about 100° C. under ambient pressure or to lower temperatures under reduced pressure). Furthermore, in certain embodiments, commercial $MgCl_2$ used in the process is contaminated with residual hydrochloride originated from the process of preparing the $MgCl_2$. In some of such embodiments, this residual hydrochloride is removed during the process of removing/evaporating the aqueous medium. In certain embodiments, the aqueous medium is or comprises water (e.g., distilled water). In some embodiments, the excess ammonium chloride (e.g., the excess amount above y moles) added in the boiling step is consumed during the process of removing/evaporating the aqueous medium.

In some embodiments, a salt product of any of Formulas I-IV is prepared by
  a. dissolving in or wetting with an aqueous medium
    i. magnesium chloride,
    ii. ammonium chloride, potassium chloride or a combination thereof, and
    iii. an acid scavenger;

b. removing the aqueous medium by evaporation to afford the salt.

In some embodiments, the molar ratio of magnesium chloride to potassium chloride to ammonium chloride is about 1:x:y. In some embodiments, the molar ratio of magnesium chloride to ammonium chloride is from about 1:1.01y to about 1:1.1y and the molar ratio of magnesium chloride to potassium chloride is about 1:x. In certain embodiments, the molar ratio of magnesium chloride to potassium chloride to ammonium chloride is from about 1:x:1.01y to about 1:x: 1.1y. In certain embodiments, the molar ratio of magnesium chloride to potassium chloride to ammonium chloride is from about 1:x:1.01y to about 1:x:1.05y. In more specific embodiments, the molar ratio of magnesium chloride to potassium chloride to ammonium chloride is about 1:x:1.02y.

In certain embodiments, the molar ratio of magnesium chloride to ampholytic acid scavenger is about 1:0.001 to about 1:0.1, or about 1:0.01 to about 1:0.05. In specific embodiments, the molar ratio of magnesium chloride to potassium chloride to ammonium chloride to glycine is about 1:x:y:about 0.02.

In certain embodiments, any acid scavenger suitable is utilized. In some embodiments, the acid scavenger is ammonia. In certain embodiments, the acid scavenger is a buffering system, e.g., a citric acid buffer system, a tartaric buffer system, or a malic acid buffer system. In some embodiments, the acid scavenger is an ampholytic acid scavenger. In more specific embodiments, the ampholytic acid scavenger is an amino acid. In some embodiments, the ampholytic acid scavenger is glycine. In certain embodiments, the acid scavenger is suitable and is used in a suitable amount to maintain the pH of the aqueous medium at less than 7, about 5.5 to about 7, or about 6 to about 6.5.

In various embodiments, the aqueous medium is removed in any process described herein under reduced pressure, subject to increased temperature, by evaporation, or a combination thereof. In specific embodiments, the aqueous medium is removed by heating the aqueous medium, to at least 50° C., at least 70° C., at least 90° C., or at least 100° C., or boiling. In other specific embodiments, the aqueous medium is removed under reduced pressure.

In some embodiments, a salt product of any of Formulas I-IV is prepared by:
   a. dissolving in or wetting with an aqueous medium
      i. magnesium chloride,
      ii. ammonium chloride, potassium chloride or a combination thereof, and
      iii. an acid scavenger;
   b. precipitating the salt from the aqueous medium;
   c. filtering the precipitate; and
   d. optionally recycling the filtrate.

In some embodiments, the molar ratio of magnesium chloride to potassium chloride to ammonium chloride is about 1:x:y. In some embodiments, the molar ratio of magnesium chloride to ammonium chloride is from about 1:1.01y to about 1:1.1y and the molar ratio of magnesium chloride to potassium chloride is about 1:x.

In certain embodiments, any acid scavenger suitable is utilized. In specific embodiments, the acid scavenger is an ampholytic acid scavenger. In more specific embodiments, the ampholytic acid scavenger is an amino acid. In some embodiments, the ampholytic acid scavenger is glycine. In certain embodiments, the acid scavenger is a buffering system, e.g., a citric acid buffer system, a tartaric buffer system, or a malic acid buffer system. In certain embodiments, the acid scavenger is not ammonia or an ammonia/ammonium buffer system. In some embodiments, the acid scavenger is ammonia (e.g., additional or excess ammonium, such as about 2 mol % excess). In some embodiments, the acid scavenger is an ampholytic acid scavenger. In more specific embodiments, the ampholytic acid scavenger is an amino acid. In some embodiments, the ampholytic acid scavenger is glycine. In certain embodiments, the acid scavenger is suitable and is used in a suitable amount to maintain the pH of the aqueous medium at less than 7, about 5.5 to about 7, or about 6 to about 6.5.

In some embodiments, wherein the molar ratio of magnesium chloride to potassium chloride to ammonium chloride is about 1:x:y. In some embodiments, the molar ratio of magnesium chloride to ammonium chloride is from about 1:1.01y to about 1:1.1y and the molar ratio of magnesium chloride to potassium chloride is about 1:x. In certain embodiments, the molar ratio of magnesium chloride to ampholytic acid scavenger is about 1:0.001 to about 1:0.1, or about 1:0.01 to about 1:0.05. In specific embodiments, the molar ratio of magnesium chloride to potassium chloride to ammonium chloride to glycine is about 1:x:y:about 0.02. In those embodiments, wherein the acid scavenger is ammonium chloride, the molar ratio of magnesium chloride to potassium chloride to ammonium chloride is 1:x:>y. In certain embodiments, the acid scavenger is ammonia; in other embodiments, the acid scavenger is not ammonia.

In certain embodiments of any of the processes described herein, a process of preparing a salt product of Formula IV further comprises dissolving in or wetting with the aqueous medium at least one physiologically acceptable salt comprising either or both of M and X. In specific embodiments, the physiologically acceptable salt is $M_aX_b$, wherein the terms a and b are determined based on the charge of the ions, e.g., independently selected from 1 and 2. In further or alternative embodiments, the physiologically acceptable salt is selected from, by way of non-limiting example, $M_aCl_b$, $K_aX_b$, $(NH_4)_aX_b$ and the like, wherein a and b are as defined above.

As used herein, dissolving includes at least partially dissolving. In some embodiments, the step of dissolving the components into the aqueous medium described herein includes heating the aqueous medium in order to dissolve the components. In certain embodiments, heating the aqueous medium causes the solubility of one or more of the individual components to be increased in the aqueous medium. As used herein, heating includes heating to any temperature above room temperature, including, e.g., above about 20° C., up to about 100° C., up to boiling, or to boiling. In some instances, evaporation includes sublimation and/or lyophilization.

In certain embodiments wherein a salt product of any of Formulas I-IV is precipitated from the aqueous medium, the individual components are dissolved in a heated aqueous medium and precipitation occurs upon cooling. In some embodiments, once the individual components are dissolved, precipitation of the salt product of any of Formulas I-IV is accomplished by decreasing the volume of the aqueous medium. In certain embodiments, the volume of the aqueous medium is decreased by evaporation. In some embodiments, evaporation is achieved under reduced pressure and/or increased temperature. In some embodiments, evaporation is achieved by increasing the temperature of the aqueous medium. In more specific embodiments, evaporation is achieved by increasing the temperature of the aqueous medium under reduced pressure.

In some embodiments, a substantially non-hygroscopic salt product, e.g., a substantially non-hygroscopic salt product of any of Formulas I-IV is prepared by mixing, grinding and/or blending a hygroscopic salt with ammonium chloride. In certain embodiments, the amount of ammonium chloride is mixed, ground or blended with the hygroscopic salt in about 1 mol-% to about 99 mol-%, about 5 mol-% to about 50 mol-%, about 10 mol-% to about 30 mol-%, or about 25 mol-% of the hygroscopic salt. In some embodiments, the hygroscopic salt is a natural salt. In certain embodiments, the hygroscopic salt is a natural salt. In some embodiments, the hygroscopic carnallite is a double salt of magnesium chloride and potassium chloride wherein the potassium chloride is present in less than stoichiometric amount to magnesium chloride (i.e., $MgCl_2.xKCl.yNH_4Cl.zH_2O$, wherein y is zero and x is less than 1). In some embodiments, the hygroscopic salt is mixed, ground and/or blended with ammonium chloride until the sum of the amount of potassium chloride and ammonium chloride is equal to a stoichiometric amount of magnesium chloride (i.e., $MgCl2xKClyNH_4Cl-zH_2O$, wherein y>0 and x+y 1). In certain embodiments, the hygroscopic salt is top or surface hygroscopic. In further embodiments, following mixing, grinding and/or blending, the mixture is dried.

In some embodiments, the salts of any of Formulas I-IV for use in food products, salt blends thereof, or particles described herein are prepared by a "bulk process," a "filtration process," a "semi-dry filtration process," a "spray drying process" or a "drum dryer process."

In certain embodiments, food salt products of any of Formulas I-IV are prepared by
    a. dissolving in or wetting with an aqueous medium
        i. magnesium chloride,
        ii. ammonium chloride, and
        iii. optionally an acid scavenger; and
    b. contacting the magnesium chloride-ammonium chloride composition (e.g., solution) of (a) with solid potassium chloride.

In some embodiments, the volume of the aqueous medium is reduced (e.g., by boiling and/or evaporation under reduced pressure and/or increased temperature) by about 30%, about 40% or about 50% prior to contacting with solid potassium chloride. In some embodiments, the solid potassium chloride is crystalline potassium chloride. In some instances, some or all of the aqueous medium is removed (e.g. absorbed by the solid potassium chloride) from the composition of (a) upon addition of the solid potassium chloride. In some instances, a dry salt blend is formed upon addition of the solid potassium chloride. In some instances, a semi-dry salt blend is formed upon addition of solid potassium chloride. In some instances, a semi-city salt blend is dried using any process described herein.

In some embodiments, an excess mol % of potassium chloride and/or sodium chloride is utilized. In some of such embodiments, use of an excess of potassium chloride and/or sodium chloride allows for the formation a "blend" or "salt blend" or "blended salt" of potassium chloride and/or sodium chloride and a salt of any of Formulas I-IV.

In some embodiments, a food salt blend is produced by a "spray drying process." A solution containing at least one component of a food salt is sprayed over at least one other component of the blend on a fluidized bed.

In certain embodiments of a spray drying process, solid potassium chloride is in a fluidized bed and the magnesium chloride-ammonium chloride composition (e.g., solution) is deposited (e.g., sprayed) onto the fluidized bed (e.g., the potassium chloride particles). In some embodiments, once the composition of (a) is deposited (e.g., sprayed) upon the solid potassium chloride, a blended salt product of any of Formulas I-IV (depending on the products utilized) containing at least one layer on the surface of the salt crystals is formed at the interface between the composition of (a) and the solid potassium chloride.

In some of such embodiments, use of an excess of potassium chloride and/or sodium chloride allows for the formation of a coated particle comprising a salt of any of Formulas I-IV that is coated with potassium chloride and/or sodium chloride. In certain embodiments, provided herein is a particle comprising a potassium chloride core and a layer comprising a salt of any of Formulas I-IV. In some embodiments, such a particle (or "blend") is prepared according to any process described herein. In certain embodiments, such a particle is further blended with sodium chloride. In some embodiments, provided herein is a particle comprising a potassium chloride core, a layer of a salt of any of Formulas I-IV and a layer of sodium chloride. In specific embodiments, such a particle comprises an inner layer of a salt of any of Formulas I-IV and an outer layer of sodium chloride. In specific embodiments, such a particle comprises an inner layer of a salt of any of Formulas I-IV and an outer layer of potassium chloride. In further embodiments, such particles further comprise additional salt layers between the core and the inner layer, between the inner layer and the outer layer, on top of the outer layer, or a combination thereof.

In some embodiments, the food salts described herein are prepared by end-drying or a "bulk process." The aqueous solutions prepared by any process described herein are evaporated to dryness. In some embodiments, evaporating to dryness allows all of the salt components, with the exception of hydrolyzed ammonium chloride, that were dissolved in the aqueous medium to crystallize out as a salt (e.g., a double salt, a triple salt or the like). In some instances, analytical evaluations are not needed. In certain instances, solutions are prepared with amount of water being about 100 ml/mol of solute(s). In certain embodiments, the amount of hydrolyzed ammonium chloride is about the same as the excess mole % of ammonium chloride added to the aqueous medium in any process described herein.

In some embodiments, the food salts and/or food salt blends are prepared by a "filtration process." In some instances, the raw-materials are weighed to a reactor and water is added to the reactor. In certain embodiments of the filtration process, an aqueous solution described herein is evaporated to about 70%, about 60% or about 50% of the initial volume when a thick crystal mass is formed. In some embodiments, the thick crystal mass is cooled and filtered, and the filtrate is recycled. In some embodiments, moist filter cake is dried and used in the preparation of salt blends described herein.

In some embodiments, the filtration process described above is modified to a "semi-dry filtration process." In some embodiments, an aqueous solution prepared by methods described herein is evaporated to about 50% of the original volume, and dry potassium chloride or a mixture of potassium chloride and sodium chloride is added to the moist crystal mass. In certain embodiments, the additional dry potassium chloride absorbs the remainder of the water and a dry salt product is obtained. In certain embodiments, the additional dry potassium chloride absorbs the remainder of the water and a "semi-dry" salt product is obtained. In some instances, a semi-thy salt product is further dried by a process described herein. In some instances, semi-dry salts are easier to handle in drying equipment. In some instances, a semi-dry filtration process yields carnallite-type salts with reduced stratification (e.g., uneven composition or mixture) in the final salt blend.

In some embodiments, the moist filter-cake from the filtration process is treated with dry potassium chloride or a mixture of potassium chloride and sodium chloride to absorb moisture and afford a semi-dry salt blend.

In some embodiments, the salts and blended salts for use in food products described herein are prepared by a "drum dryer" process. In some embodiments, a drum dryer process comprises (a) optionally moisturizing or treating with water or water vapour (i.e., wetting) the components of the food salts and/or blended food salts described herein, (b) rolling the components of the food salts and/or blended food salts for a prolonged time (e.g., about 8 hours, about 12 hours, about 16 hours or about 24 hours or more) in a drum dryer and (c) drying the resulting salt or salt blend using any method described herein.

In some instances step (a) is omitted and the components of the food salts are moisturized or wetted by the water present in one or more of the component salts (e.g., when one or more of the component salts are salt hydrates). In some instances, a drum dryer process achieves ion-exchange between the crystals and/or salt components. In some instances, food salts obtained from a drum dryer process have lower CRH values. In some instances, salts prepared by a drum dryer process are used to prepare salt blends that are used to prepare food salt solutions. Food salts used as solutions are added to food products (e.g. liquid food products (e.g. soups, sauces)) that are boiled or heat-treated prior to consumption.

In some embodiments of any process described herein, the component salts utilized in the process are salt particles. In some embodiments of any process described herein, the component salts (e.g., magnesium chloride, potassium chloride or ammonium chloride) are of the same particle size. In some embodiments of any process described herein, the component salts (e.g., magnesium chloride, potassium chloride or ammonium chloride) are of different particle sizes.

In certain embodiments of any method of preparation of a food salt or a blend of a food salt described herein, any suitable acid scavenger suitable is utilized. In some embodiments, the acid scavenger is ammonia. In some embodiments, ammonia is added in an amount that maintains the pH at about 7. In those embodiments wherein the acid scavenger is ammonia, excess ammonium chloride is optionally not added to the aqueous medium. In certain embodiments, the acid scavenger is a buffering system, e.g., a citric acid buffer system, a tartaric buffer system, or a malic acid buffer system. In some embodiments, the acid scavenger is an ampholytic acid scavenger. In some embodiments, the ampholytic acid scavenger is an amino acid. In some embodiments, the ampholytic acid scavenger is glycine. In some embodiments, the acid scavenger is a basic salt (e.g., calcium phosphate, calcium carbonate, magnesium phosphate, magnesium carbonate or the like). In certain embodiments, the acid scavenger is used in a suitable amount to maintain the pH of the aqueous medium at less than 7, about 5.5 to about 7, or about 6 to about 6.5. In certain embodiments, the molar ratio of magnesium chloride to ampholytic acid scavenger is about 1:0.001 to about 1:0.1, or about 1:0.01 to about 1:0.05. In specific embodiments, the molar ratio of magnesium chloride to potassium chloride to ammonium chloride to an acid scavenger is about 1:x:y:about 0.02.

In various embodiments, any two or more of the component salts described herein (e.g., magnesium chloride and potassium chloride) are utilized in any of the processes described herein in the form of a double salt, a triple salt, or the like, such as a natural carnallite, a modified carnallite, a hygroscopic carnallite, a poor tasting carnallite, or the like. In a specific embodiment, magnesium chloride and potassium chloride are provided in the form of a carnallite salt and are processed according to any of the processes described herein with ammonium chloride.

Salt Compositions

In certain embodiments, provided herein is a composition comprising a salt product of any of Formulas I-IV. In some embodiments, the composition comprises a salt product of any of Formulas I-IV and at least one additional salt. In specific embodiments, the at least one additional salt is selected from potassium chloride, sodium chloride and combinations thereof. In certain embodiments, the composition comprises a salt component comprising a salt product of any of Formulas I-IV and potassium chloride and/or sodium chloride. In specific embodiments, the salt component comprises, by weight, about 0 to about 99%, about 1% to about 99%, about 50% to about 99%, about 50% to about 90%, or about 50% to about 75% sodium chloride. In further or alternative embodiments, the salt component comprises, by weight, 0% to about 99%, about 1% to about 99%, 0% to about 50%, greater than 0% to about 25%, about 1% to about 25%, or about 5% to about 25% potassium chloride. In further or alternative embodiment, the salt component comprises, by weight, about 1% to about 99%, about 5% to about 50%, or about 25% of a salt product of any of Formulas I-IV. In further embodiments, the composition comprises one or more additional salts. In specific embodiments, blends provided herein comprise a combination of salts (w/w %) as set forth in Table 1 or Table 2.

TABLE 1

| Salt | Composition I | Composition II | Composition III | Composition IV |
|---|---|---|---|---|
| NaCl | 0-90% | 25-75% | 40-70% | 45-60% |
| KCl | 0-90% | 5-50% | 10-30% | 15-25% |
| Salt Product | 0.1-90% | 5-50% | 10-30% | 15-25% |

In some embodiments, provided herein are particles comprising (i) a salt product of any of Formulas I-IV, and (ii) potassium chloride, sodium chloride, or a combination thereof. In certain embodiments, the particle comprises a core and at least one layer. In some embodiments, the core comprises a salt product of any of Formulas I-IV. In further embodiments, the at least one layer comprises potassium chloride and/or sodium chloride. In certain embodiments, coating the salt core with at least one layer provides an improved taste compared to an uncoated salt particle. In some embodiments, such particles are prepared by mixing particles comprising a salt product of any of Formulas I-IV with potassium chloride and/or sodium chloride. In specific embodiments, the potassium chloride and/or sodium chloride are in the form of a powder or fine particulates. In some embodiments, the particulates of the salt product are mixed with the potassium chloride and/or sodium chloride for at least 1 hour, at least 4 hours, at least 8 hours, at least 12 hours, at least 16 hours, or at least 24 hours.

In certain embodiments, the salt product blended with an additional salt (e.g., sodium chloride and/or potassium chloride) as described herein, the blend has a critical relative humidity (CRH) value of greater than about 70%, greater than about 75%, greater than about 80%, greater than 85%, greater than 90%, or greater than 95% at 30° C. In specific embodiments, the salt product blended with an additional salt (e.g., sodium chloride and/or potassium chloride) has a CRH value greater than the CRH value for the salt product alone.

In some embodiments, the composition comprising a salt product of any of Formulas I-IV comprises a salt product of any of Formulas I-IV in associated, dissociated or partially dissociated form. Accordingly, in certain embodiments, provided herein is a composition comprising a salt product of any of Formulas I-IV that has been dissolved in an aqueous medium. In specific embodiments, the aqueous medium is or comprises potable water. In certain embodiments, dissolved includes, e.g., completely dissolved or partially dissolved, including at least 99% dissolved, at least 95% dissolved, or at least 50% dissolved. In some embodiments, the aqueous composition is saturated with a salt product of any of Formulas I-IV. In certain embodiments, the aqueous composition comprises a salt component, wherein the salt component comprises a salt product of any of Formulas I-IV, and one or more of sodium chloride and potassium chloride. In specific embodiments, the salt component comprises, by weight, about 0 to about 99%, about 1% to about 99%, about 50% to about 99%, about 50% to about 90%, or about 50% to about 75% sodium chloride. In further or alternative embodiments, the salt component comprises, by weight, 0% to about 99%, about 1% to about 99%, 0% to about 50%, greater than 0% to about 25%, about 1% to about 25%, or about 5% to about 25% potassium chloride. In further or alternative embodiment, the salt component comprises, by weight, about 1% to about 99%, about 5% to about 50%, or about 25% of a salt product of any of Formulas I-IV. In certain embodiments, the aqueous composition is saturated with the salt component. In some embodiments, up to about 40% (w/w), or up to about 30% (w/w) of the aqueous composition is the salt component.

In certain embodiments, provided herein is an aqueous composition prepared by dissolving a salt component in an aqueous medium. In specific embodiments, the aqueous medium is or comprises potable water. In certain embodiments, the aqueous composition is prepared by dissolving a salt product of any of Formulas I-IV in an aqueous medium. In further embodiments, the aqueous composition is prepared by dissolving a salt product of any of Formulas I-IV and one or more of sodium chloride and potassium chloride in an aqueous medium. In specific embodiments, the salt component comprises, by weight, about 0 to about 99%, about 1% to about 99%, about 50% to about 99%, about 50% to about 90%, or about 50% to about 75% sodium chloride. In further or alternative embodiments, the salt component comprises, by weight, 0% to about 99%, about 1% to about 99%, 0% to about 50%, greater than 0% to about 25%, about 1% to about 25%, or about 5% to about 25% potassium chloride. In further or alternative embodiment, the salt component comprises, by weight, about 1% to about 99%, about 5% to about 50%, or about 25% of a salt product of any of Formulas I-IV. In some embodiments, up to about 40% (w/w), or up to about 30% (w/w) of the aqueous composition is the salt component. In various embodiments, the salt product of any of Formulas I-IV, the sodium chloride and/or the potassium chloride are dissolved concurrently, or individually. In further embodiments, one or more additional salts are also dissolved in the aqueous medium.

In some embodiments, provided herein is an aqueous solution comprising magnesium cations, potassium cations and ammonium cations. In certain embodiments, the molar ratio of magnesium cations to potassium cations to ammonium cations is about 1:x:y, wherein the sum of the terms x and y is about 1 and wherein y is from greater than 0 to about 1 and x is from 0 to about 1. In further or alternative embodiments, the aqueous solution further comprises chloride anions. In certain embodiments, the molar ratio of magnesium cations to chloride anions is from about 1:2 to about 1:3, about 1:2.9 to about 1:3, or about 1:2.95 to about 1:3. In certain embodiments, the molar ratio of sodium cations to chloride anions is 1:3.00.

In further or alternative embodiments, provided herein is an aqueous solution comprising sodium cations, potassium cations, magnesium cations, and ammonium cations. In specific embodiments, the molar ratio of the sodium cations to potassium cations is from about 1:0.05 to about 1:0.5. In further or alternative embodiments, the molar ratio of sodium cations to magnesium cations is from about 1:0.05 to about 1:0.1. In further or alternative embodiments, the molar ratio of sodium cations to ammonium cations is from 1:0 to 1:0.1, or from 1:0.001 to 1:0.1. In other embodiments, the molar ratio of sodium cations to potassium cations is from 1:0.005 to 1:0.5, the molar ratio of sodium cations to magnesium cations is from 1:0.005 to 1:0.1, and wherein the molar ratio of sodium cations to ammonium cations is from 1:0 to 1:0.1.1n further or alternative embodiments, the aqueous solution further comprises chloride anions.

In certain embodiments, an aqueous solution comprising sodium cations, potassium cations, magnesium cations, and ammonium cations, as described herein, further comprises an insignificant amount of one or more of sulfate ions, gold ions, silver ions, bromide ions, iodide ions, phosphate ions, and/or sulfide ions. In specific embodiments, an insignificant amount of an ion is, by way of non-limiting example, less than about 100 ppm, less than about 50 ppm, less than about 25 ppm, or less than about 5 ppm. In certain embodiments, an insignificant amount of gold cations, silver cations and/or selenium cations is an amount less than about 25 ppm, less than about 5 ppm, less than about 1 ppm, or less than about 0.1 ppm. In further or alternative embodiments, an aqueous solution described herein further comprises a physiologically important ion including, e.g., sulfate, phosphate, silicate, nitrite, selenate, iodide, copper cations, cobalt cations, manganese cations, molybdenum cations and combinations thereof.

In certain embodiments, the pH of any of the aqueous compositions/solutions described herein is about 6 to about 7, or about 6 to about 6.8.

In some embodiments, the aqueous solutions described herein are prepared by dissolving in or wetting with an aqueous medium, a salt product of any of Formulas I-IV and one or more of potassium chloride and sodium chloride.

Table 2 provides illustrative examples of the compositions described herein.

TABLE 2

| Salt | Composition A | Composition B | Composition C | Composition D |
|---|---|---|---|---|
| NaCl | 70% | 62.5% | 55% | 50% |
| KCl | 5% | 12.5% | 20% | 25% |
| Salt Product | 25% | 25% | 25% | 25% |

In certain embodiments, the salts described herein are dissolved in an aqueous medium. In certain embodiments, Compositions A, B and/or C are dissolved in an aqueous medium. Table 3 illustrates various forms of the salt product of any of Formulas I-IV that are utilized in the Compositions A, B and/or C of Table 1 and the concentrations (% w/w) at which aqueous solutions of such compositions become saturated. Saturation concentrations are determined by dissolving salt compositions into 50 mL of water at about 16.7° C. adding 0.5 grams of the salts at a time to reach the saturated solutions using a magnetic stirrer.

TABLE 3

| Salt Product | Saturation Concentration in Water (% w/w) | | |
|---|---|---|---|
| | Composition A | Composition B | Composition C |
| $MgCl_2 \cdot KCl \cdot 6H_2O$ | 26.5% | 29.5% | 32.5% |
| $MgCl_2 \cdot \frac{3}{4}KCl \cdot \frac{1}{4}NH_4Cl \cdot 6H_2O$ | 29.0% | 31.0% | 33.0% |
| $MgCl_2 \cdot \frac{1}{2}KCl \cdot \frac{1}{2}NH_4Cl \cdot 6H_2O$ | 32.5% | 35.0% | 37.5% |
| $MgCl_2 \cdot \frac{1}{4}KCl \cdot \frac{3}{4}NH_4Cl \cdot 6H_2O$ | 29.0% | 30.5% | 32.0% |
| $MgCl_2 \cdot NH_4Cl \cdot 6H_2O$ | 28.5% | 31.0% | 34.0% |

In specific embodiments, any of the aqueous solutions provided herein is potable.

In certain embodiments, the salt products disclosed herein are blended with a polyhydroxy compound. In some embodiments, the polyhydroxy compound is mannitol, sorbitol, xylitol, or combinations thereof. In some embodiments, blending the salt products disclosed herein with a polyhydroxy compound (e.g. mannitol, sorbitol, xylitol) improves the stability of the salt products in humid conditions. In some embodiments, blending a polyhydroxy compound (e.g. mannitol, sorbitol, xylitol) with a salt product disclosed herein inhibits (either partially or fully) the ability of a water molecule to bind to a salt product. In some embodiments, about 1-5 grams of polyhydroxy compound (e.g. mannitol, sorbitol, xylitol) is blended with about 1 mol of salt product. In some embodiments, about 2-4 grams of polyhydroxy compound (e.g. mannitol, sorbitol, xylitol) is blended with about 1 mol of salt product. In some embodiments, about 3 grams of polyhydroxy compound (e.g. mannitol, sorbitol, xylitol) is blended with about 1 mol of salt product.

In certain embodiments, the salt aqueous solutions disclosed herein are blended with a polyhydroxy compound. In some embodiments, the polyhydroxy compound is mannitol, sorbitol, xylitol, or combinations thereof. In some embodiments, about 1-5 grams of polyhydroxy compound (e.g. mannitol, sorbitol, xylitol) is blended with about 1 mol of salt product. In some embodiments, about 2-4 grains of polyhydroxy compound (e.g. mannitol, sorbitol, xylitol) is blended with about 1 mol of salt product. In some embodiments, about 3 grams of polyhydroxy compound (e.g. mannitol, sorbitol, xylitol) is blended with about 1 mol of salt product.

Uses

In certain embodiments, a salt product described herein is utilized as a seasoning. In further or alternative embodiments, a salt product described herein is a sodium salt (e.g., sodium chloride) substitute. In certain embodiments, provided herein is a composition comprising a salt product of any of Formulas I-IV and sodium chloride (e.g., a portion of the sodium salt is substituted with a salt product of any of Formulas I-IV).

In some embodiments, a salt product or composition provided herein is used in food products. In certain embodiments, salt products provided herein are used as salt substitutes for sodium salts. In further or alternative embodiments, a salt product provided herein is utilized as a flavoring agent and/or as a preservative agent and is, optionally, utilized in food products. In certain embodiments, a product or composition described herein is utilized as a substitute for a flavoring agent or preservative in a food or nutrient product. In further or alternative embodiments, the salt products or compositions described herein are utilized in a process of preparing a food product wherein the salt products or compositions described herein at least partially replace or substitute a sodium salt (e.g., sodium chloride).

In specific embodiments, a salt product of any of Formulas I-IV or a composition described herein is utilized as a flavoring agent and/or preservative in food products, including, by way of non-limiting example, meats (e.g., cooked meat products, ground meat products, sausages and hot dogs), snack foods (e.g., dry snacks, baked cheese snacks, potato chips, sweet crackers, snack bars, granola bars, candy bars, breakfast bars, and salty crackers), dairy foods (e.g., conventional cheese, cheese spread, cheeses), dried or dehydrated foods (e.g., dried soups and milk powder), canned foods (e.g., canned sauces, and mined soup), ready meals, (frozen and non-frozen), frozen foods (e.g., frozen pizza, frozen television dinners), fish, vegetables, yeast-based or products (e.g., conventional breads, breads and pastries), spices (e.g., curry or garam masala), condiments (e.g., ketchup, mayonnaise, pasta sauce, salad dressing, soy sauce, and barbeque sauce), soy products, beverages (e.g., sports drinks and soda pop) and the like. In some embodiments, a salt product of any of Formulas I-IV or a composition described herein is utilized as or in a seasoning product, a spice product, or a food salt product.

Thus, provided in certain embodiments herein are food products, nutrient substances, semi-finished food products, and a processed food products that have, during the preparation thereof, been processed, flavored or preserved with any salt or salt composition described herein.

In certain instances, food products comprise food acids, acidity regulators, anti-caking agents, anti-foaming agents, antioxidants, bulking agents, food coloring, color retention agents, emulsifiers, flavors, flavor enhancers, flour treatment agents, humectants, tracer gas, preservatives, stabilizers, sweeteners, thickeners and the like. In some embodiments, food acids are added to make flavors "sharper" and also act as a preservative and antioxidant. Common food acids include, by way of non-limiting example, vinegar, citric acid, tartic acid, malic acid, fumaric acid and lactic acid. In certain embodiments, acidity regulators are used to change or otherwise control the acidity and alkalinity of foods. In some embodiments, anti-caking agents keep powders such as milk powder from caking or sticking. In certain embodiments, anti-foaming agents reduce or prevent foaming in foods. In some embodiments, anti-oxidants such as vitamin C act as preservatives by inhibiting the effects of oxygen on the food and can be beneficial to health. In certain embodiments, bulking agents such as starch are additives that increase the bulk of a food without affecting its nutritional value. In some embodiments, food colorings are added to food to replace colors lost during preparation or to improve the aesthetics of a food. In some embodiments, color retention agents are used to preserve a food's existing color. In certain embodiments, emulsifiers allow water and oils to remain mixed together in an emulsion, as in mayonnaise, ice cream and homogenized milk. In some embodiments, flavors are additives that give food a particular taste or smell and may be derived from natural ingredients or created artificially. In some embodiments, flour treatment agents are added to flour to improve its color or its use in baking. In certain embodiments, humectants prevent foods from drying out. In some embodiments, tracer gas allows for package integrity testing to prevent foods from being exposed to atmosphere, thus guaranteeing shelf life. In some embodiments, preservatives prevent or inhibit spoilage of food due to fungi, bacteria and other microorganisms. In certain embodiments, stabilizers, thickeners and gelling agents, like agar or pectin (used in jam for example) give foods a firmer texture. In some cases, while stabilizers are not true emulsifiers, they help to stabilize emulsions. In some embodiments, sweeteners are added to foods for flavoring. In certain instances, sweeteners other than sugar are added to keep the food energy (calories) low, or because they have beneficial effects for diabetes mellitus and tooth decay and diarrhea. In some embodiments, thickeners are substances which, when added to the mixture, increase its viscosity without substantially modifying its other properties. In some embodiments, a salt product or a composition described herein is present in or is utilized in preparing a food product to reduce the amount of or substitute one or more of a spice, a food acids, acidity regulators, anti-caking agents, anti-foaming agents, antioxidants, bulking agents, food coloring, color retention agents, emulsifiers, flavors, flavor enhancers, flour treatment agents, humectants, tracer gas, preservatives, stabilizers, sweeteners, thickeners and the like used therein.

In certain instances, frozen foods comprise spices (e.g., black pepper, chili, white pepper, oregano, paprika, garlic, and the like), flavors (e.g., pork flavor, beef flavor, steak flavor, chicken flavor, onion flavor, and the like), sodium nitrite, sodium ascorbate, dextrose, sodium phosphates, corn syrup solids, sodium stearoyl lactylate, sodium aluminum phosphate, ascorbic acid, BHA, BHT, citric acid, and combinations thereof. In some embodiments, a salt product or a composition described herein is present in or is utilized in preparing a frozen food product to reduce the amount of or substitute one or more of a spice, a flavor, sodium nitrite, sodium ascorbate, dextrose, sodium phosphate, a corn syrup solid, sodium stearoyl lactylate, sodium aluminum phosphate, ascorbic acid, BHA, BHT, and/or citric acid used therein.

In some instances, snack foods (e.g., dry snacks and/or baked cheese snacks) comprise TBHQ, nialtodeictrin, natural flavors (e.g., cheese), disodium inosinate, disodium guanylate, sodium caseinate, spices (e.g., black pepper, chili, white pepper, oregano, paprika, garlic, cajun pepper, and the like), and combinations thereof. In some embodiments, a salt product or a composition described herein is present in or is utilized in preparing snack food (e.g., dry snacks and/or baked cheese snacks) to reduce the amount of or substitute one or more of TBHQ, maltodextrin, a natural flavor, disodium inosinate, disodium guanylate, sodium caseinate, and/or a spice used therein.

In some instances, dairy foods comprise stabilizers (e.g., carob bean, xanthan and/or guar gums), potassium sorbate, sodium diacetate, preservatives (e.g., sorbic acid), and combinations thereof. In certain embodiments, a salt product or composition described herein is present in or is utilized in preparing a dairy food product to reduce the amount of or substitute one or more of a stabilizer, potassium sorbate, sodium diacetate, and/or a preservative used therein.

In certain embodiments, the compositions described herein are utilized in any of the uses described herein. In certain embodiments, aqueous compositions comprising a salt product of any of Formulas I-IV, and one or more of sodium chloride and potassium chloride having salt concentrations of up to about 40% (w/w), or up to about 30% (w/w), up to about 20% (w/w), up to about 15% (w/w), up to about 10% (w/w) or up to about 5% (w/w) are utilized. In certain embodiments, the compositions further comprise additional additives. In specific embodiments, the additional additives include additives suitable for enhancing the flavor and/or the preservative characteristics of the salts. In further or alternative embodiments, the additional additives include any seasoning and/or food additive.

In certain embodiments, the salts described herein are also utilized in, by way of non-limiting example, mouth-flush mixtures, antiseptics (e.g., pastes and ointments) and pastes for reducing the formation of varicose veins. In some embodiments, the salts described herein are utilized in protein hydrolysates, flavonoids, steroids and the like. Thus, in certain embodiments, such products are provided for herein. In some embodiments, a salt product or composition described herein is utilized as a salt substitute by an individual to treat hypomagnesia. In certain embodiments, aqueous solutions of the salts and/or salt blends described herein are used as electrolyte replenishing mixtures in the treatment of, e.g., travellers' diarrhea, dehydration due to cholera, gastrointestinal distress, *salmonella* or *E. coli* infections and the like.

In some embodiments, the salts described herein are utilized as a flavoring enhancing agent. Thus, in certain embodiments, provided herein is a composition (a flavoring product) comprising a salt (or salt blend) described herein and a flavoring agent. In specific embodiments, such a composition is a food additive. In some embodiments, provided herein is a method of reducing the amount of a flavoring agent necessary to achieve a desired flavor in a food (or other item that is inserted into the mouth, such as mouth-flush mixtures, antiseptics, or the like) by combining an effective amount of a salt or salt blend described herein with the flavoring agent.

Flavoring agents suitable for combination with spices (e.g., peppers, curry, herbes de provence, five spice powder, garam masala, black pepper, chili, chili peppers, white pepper, oregano, paprika, garlic, and the like), salts (e.g., sodium chloride), other flavors (e.g., pork flavor, beef flavor, steak flavor, chicken flavor, onion flavor, hoisin sauce, oyster sauce), and the like. In specific embodiments, provided herein is a reduced sodium soy sauce comprising a food salt product of any of Formulas I-IV.

EXAMPLES

The examples described below provide non-limiting illustrative examples of the products and processes described herein.

Example 1

The example describes a method to produce a mixed carnallite containing 25 mol-% of potassium chloride and 75 mol-% of ammonium chloride by filtering method. 2 mol-% excess of ammonium chloride was included into the method.

1.0 mol (203.3 g) of magnesium chloride hexahydrate, 0.25 mol (18.64 g) of potassium chloride and 0.765 mol (40.93 g) of ammonium chloride were dissolved to 125 ml of water. The mixture was concentrated by boiling until 50 ml of water was left in the mixture. The mixture was cooled, filtered by suction and the crystal mass was dried in a rotating drum in a temperature of 50° C.

Yield: 236 g (90%) of white crystalline product with pleasant taste. The product is virtually unhygroscopic.

Example 2

The example describes a method to produce ammonium carnallite with total evaporation to dryness including 2 mol-% of excess ammonium chloride.

1.02 mol (54.6 g) of ammonium chloride and 1.0 mol (203.3 g) of magnesium chloride hexahydrate were added to 120 ml of water. The mixture was heated to boiling with stirring to evaporate most of the water. The formed thick moist crystal mass was mixed with spatula and heated gently until dry product was formed.

Yield: 256 g (theor.) of white salt having a pleasant, slightly sour taste. The product is virtually unhygroscopic.

Example 3

The example describes a method to produce potassium carnallite by total evaporation of water in the presence of glycine (1 mol-%) and ammonium chloride (2 mol-%).

1.0 mol (203.3 g) of magnesium chloride hexahydrate and 1.0 mol (74.55 g) of potassium chloride were added to 125 ml of water. Glycine (0.75 g) and ammonium chloride (1.07 g) were added and the mixture was treated as described in example 2. Both of the buffering agents were mainly exhausted in the final stages of the drying.

Yield: 278 g (theor.) of white salt having a note of sea water. The product is slightly hygroscopic in a humidity over 70% RH but is stabilized when mixed with alkali chlorides.

Example 4

The example describes a method to produce a mixed carnallite containing 25 mol-% of ammonium chloride and 75 mol-% of potassium chloride by filtering method. 2 mol-% excess of ammonium chloride was present in the mixture.

1.0 mol (203.3 g) of magnesium chloride hexahydrate, 0.75 mol (55.91 g) of potassium chloride and 0.255 mol (13.65 g) of ammonium chloride were added to 125 ml of water. The excess of water was evaporated by boiling to a point having 40 ml of water left in the mixture. The mixture was cooled, filtered by suction and dried in a rotating drum (50° C.).

Yield: 231 g (85%) of white, virtually unhygroscopic material with small crystal size. The taste is pleasing.

Example 5

The example describes a method to produce a mixed carnallite containing 50 mol-% of potassium chloride and 50 mol-% of ammonium chloride by total evaporation to dryness. Excess of ammonium chloride (2 mol-%) is present in the mixture.

1.0 mol (203.3 g) of magnesium chloride, 0.5 mol (37.28 g) of potassium chloride and 0.51 mol (27.29 g) of ammonium chloride were dissolved to 125 ml of water. The mixture was treated as described in the example 2 to produce a freely flowing salt.

Yield: 224 g (84%) of white, virtually unhygroscopic material with small crystal size and a pleasant salty taste.

Salt products comprising different amounts of potassium and ammonium are prepared in similar manners by adjusting the mol-% of ammonium chloride and mol-% of potassium chloride dissolved into water.

Example 6

Depending on the use, different ratios of potassium to ammonium are utilized in salt products and compositions described herein. Salt products and compositions described herein, including e.g., those of Tables 1-3, are deposited in incrementally increasing amounts on a food product (e.g. from 0.01 mg of salt product per gram of food product). The food products are then tasted by a sample of healthy volunteers and the taste is rated on a scale of 1-10. The food products are then stored and the preservative characteristic of the salt product or composition is rated on a scale of 1-10.

In certain instances, wherein the salt products or compositions described herein are utilized as a preservative, the best salt products or compositions described herein are determined based on potassium to ammonium ratios produce the best taste and best preservative characteristic. In certain instances, wherein the salt product or compositions described herein are utilized as a flavoring agent alone, only the taste of the salt need be considered.

Example 7

Two pieces of 10 g were cut from a "market-fresh" salmon; both pieces having a remarkable area of the typical silver-colored skin. Both of the pieces were salted, the first with 0.5 g of table salt and the other with 0.5 g of the salt product of Example 3. Both of the samples were stored in a refrigerate room in a temperature of 12° C. and the chemiluminence of the salmon skin were observed visually from time to time. It was found that the luminence of the sample salted with table salt disappeared after storage for 48 hours. The luminance of the salted sample continued for an additional 55 hours before fading. Thus, the salt product of Example 2 is illustrated to have an ability to prevent the formation of formic acid in the deterioration of the fish flesh. Similar effects have been found in ham and other meat products.

Example 8

Salt products and compositions described herein, including e.g., those of Tables 1-3, are formulated in combination with a flavoring agent (e.g., a salt or a spice) in incrementally increasing weight % amounts. Each of the combinations are then tasted by a sample of healthy volunteers in increasing amounts (e.g., from 1 mg of combination). The combinations are then tasted by a sample of healthy volunteers and the taste is rated on a scale of 1-10.

Additionally, or alternatively, each of the combinations are placed on a food product in increasing amounts (e.g. from 0.01 mg of salt product per gram of food product). The food products are then tasted by a sample of healthy volunteers and the taste is rated on a scale of 1-10.

Example 9

The example describes a method to produce a mixed carnallite containing 25 mol-% of potassium chloride and 75 mol-% of ammonium chloride by filtering method. 2 mol-% excess of ammonium chloride is included into the method.

1.0 mol (203.3 g) of magnesium chloride hexahydrate, 0.25 mol (18.64 g) of potassium chloride and 0.765 mol (40.93 g) of ammonium chloride are dissolved to 125 ml of water. The mixture is concentrated by boiling until 50 ml of water was left in the mixture. The mixture is heated to boiling with stirring to evaporate most of the water. The formed thick moist crystal mass is agitated and heated gently until dry product is formed.

Example 10

The example describes a method to produce a mixed carnallite containing 25 mol-% of potassium chloride and 75 mol-% of ammonium chloride by filtering method. 2 mol-% excess of ammonium chloride is included into the method.

1.0 mol (203.3 g) of magnesium chloride hexahydrate, 0.25 mol (18.64 g) of potassium chloride and 0.765 mol (40.93 g) of ammonium chloride are dissolved to 125 ml of water. The mixture was concentrated by boiling until 50 ml of water was left in the mixture. The mixture was cooled, filtered by suction and the crystal mass was dried in a rotating drum in a temperature of 50° C.

Example 11

Figure 2:
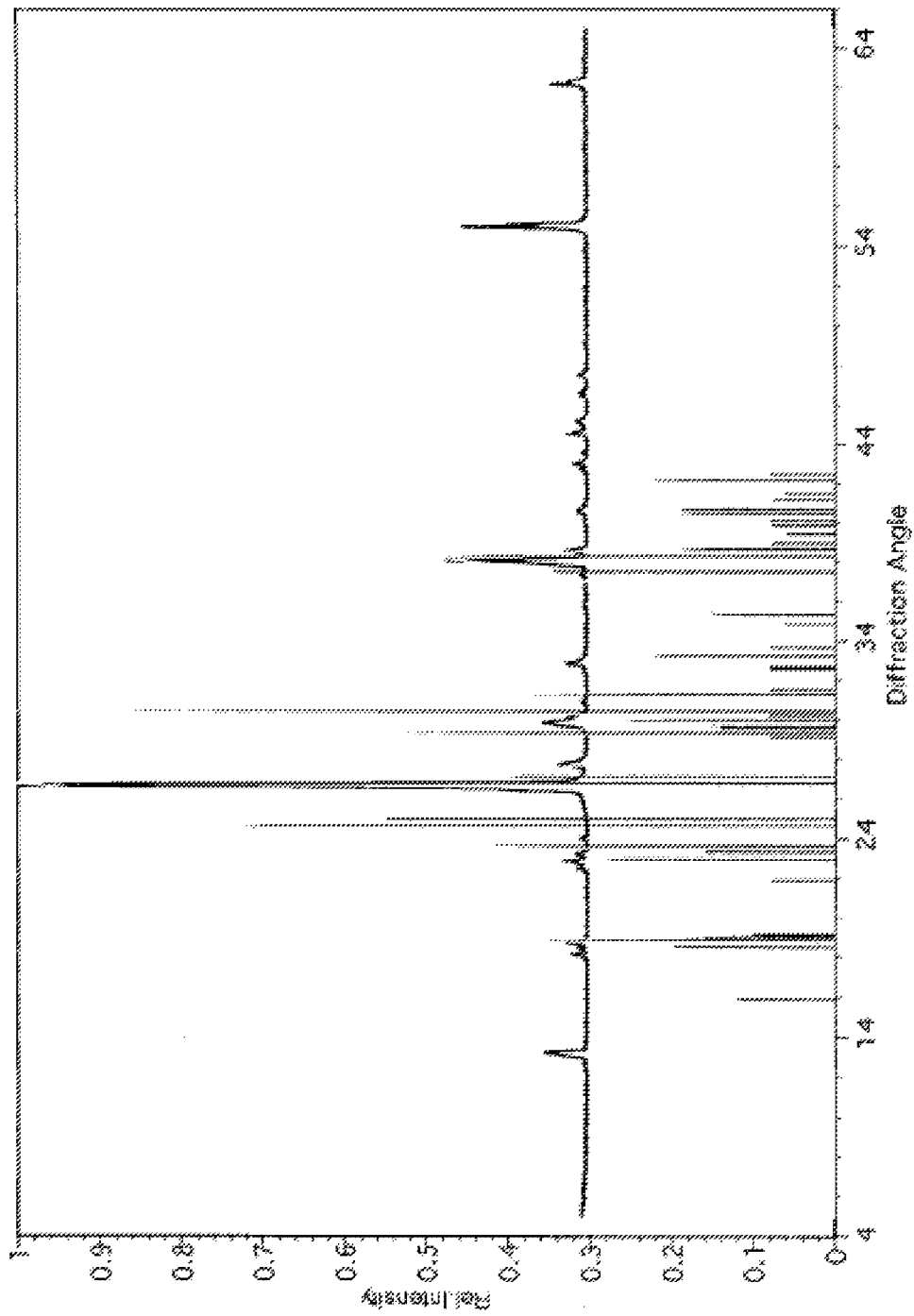
FIG. 2 illustrates the X-Ray Diffraction (XRD) pattern for a salt product having the formula $MgCl_2 \cdot xKCl \cdot yNH_4Cl \cdot zH_2O$, wherein x is about 0.25, y is about 0.75 and z is about 6, with a stick pattern reference for $KMgCl_3 \cdot 6H_2O$.
Figure 3:
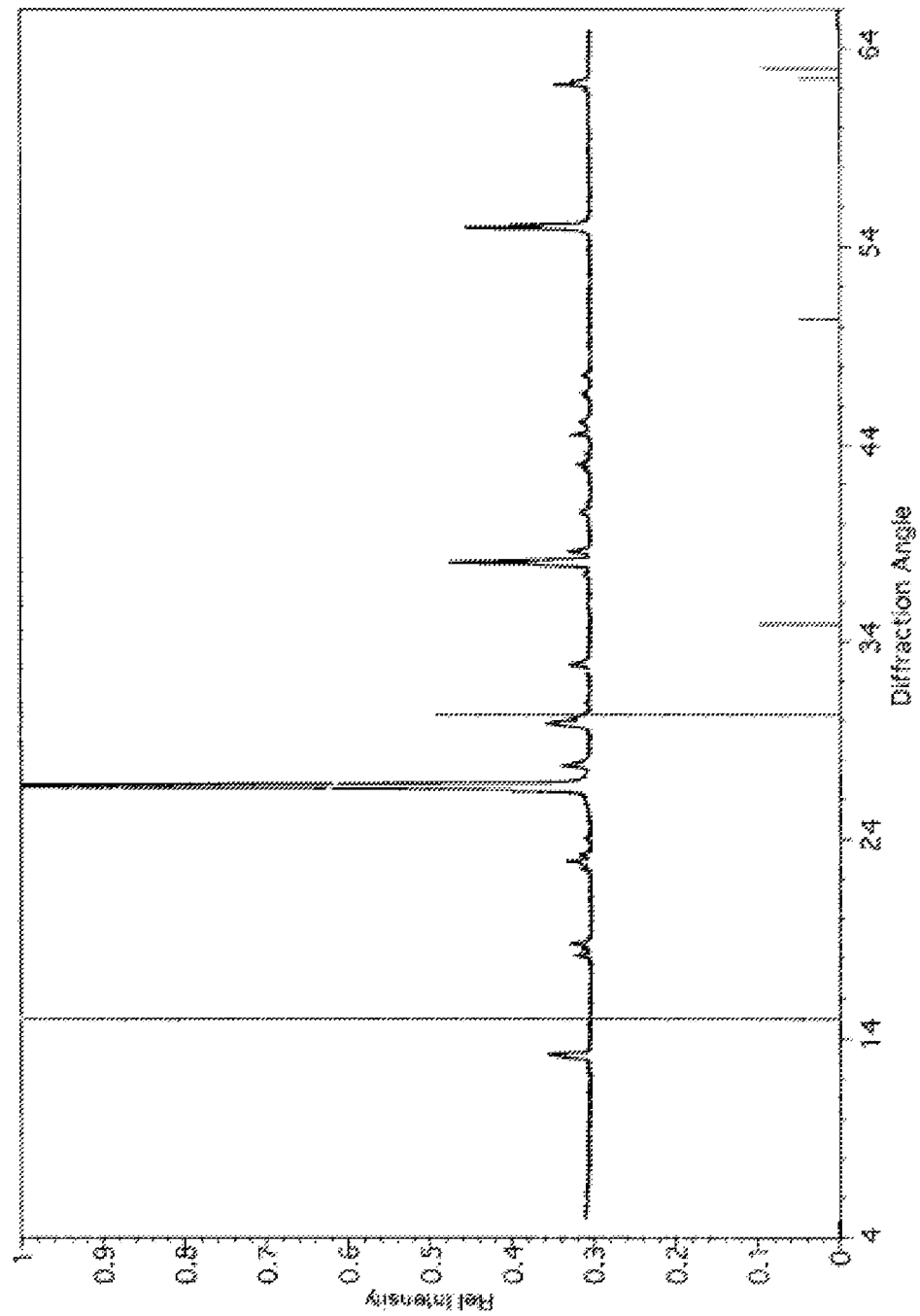
FIG. 3 illustrates the X-Ray Diffraction (XRD) pattern for a salt product having the formula $MgCl_2 \cdot xKCl \cdot yNH_4Cl \cdot zH_2O$, wherein x is about 0.25, y is about 0.75 and z is about 6, with a stick pattern reference for $MgCl_2$.
Figure 4:
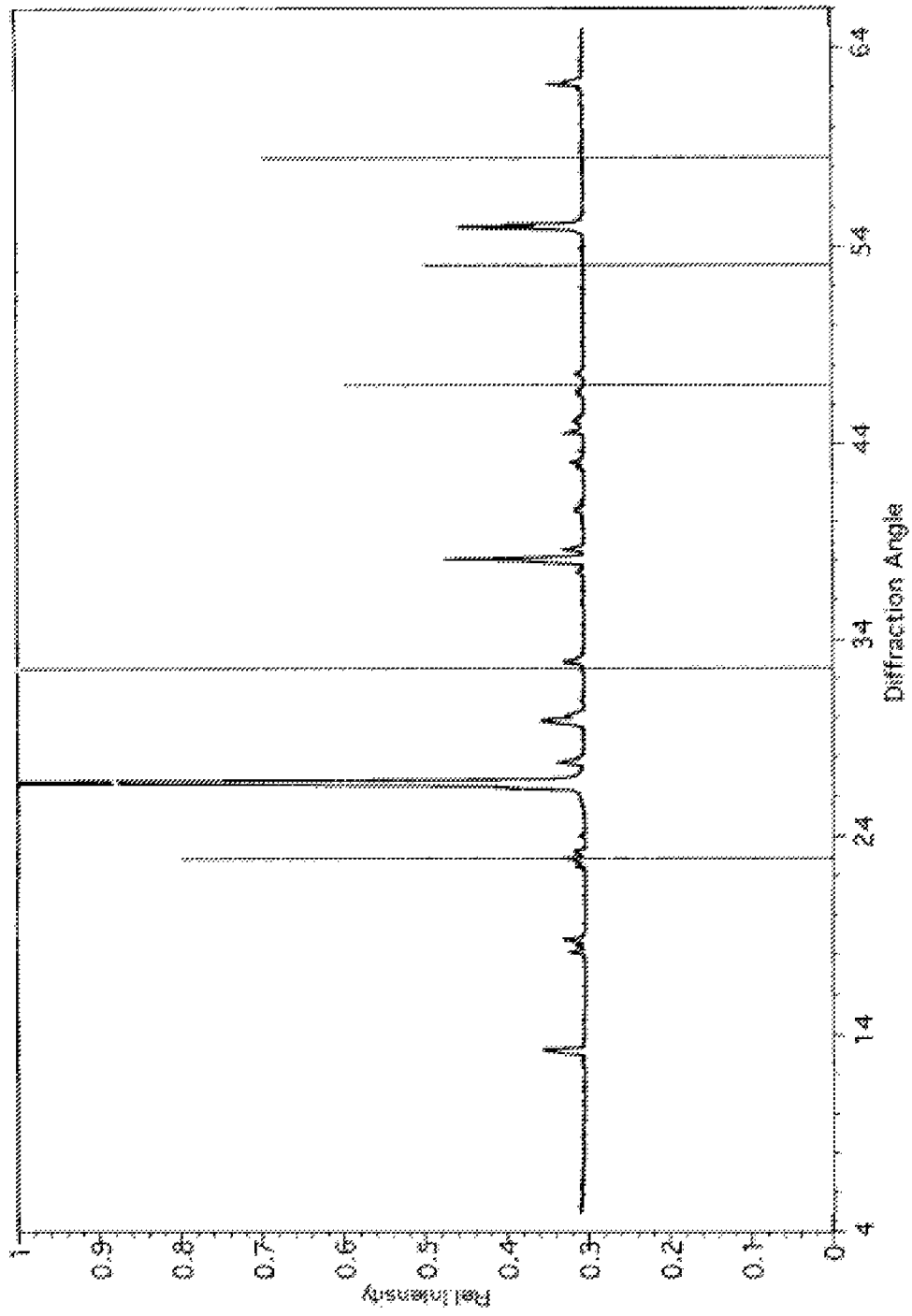
FIG. 4 illustrates the X-Ray Diffraction (XRD) pattern for a salt product having the formula $MgCl_2 \cdot xKCl \cdot yNH_4Cl \cdot zH_2O$, wherein x is about 0.25, y is about 0.75 and z is about 6, with a stick pattern reference for $NH_4Cl$.
Figure 5:
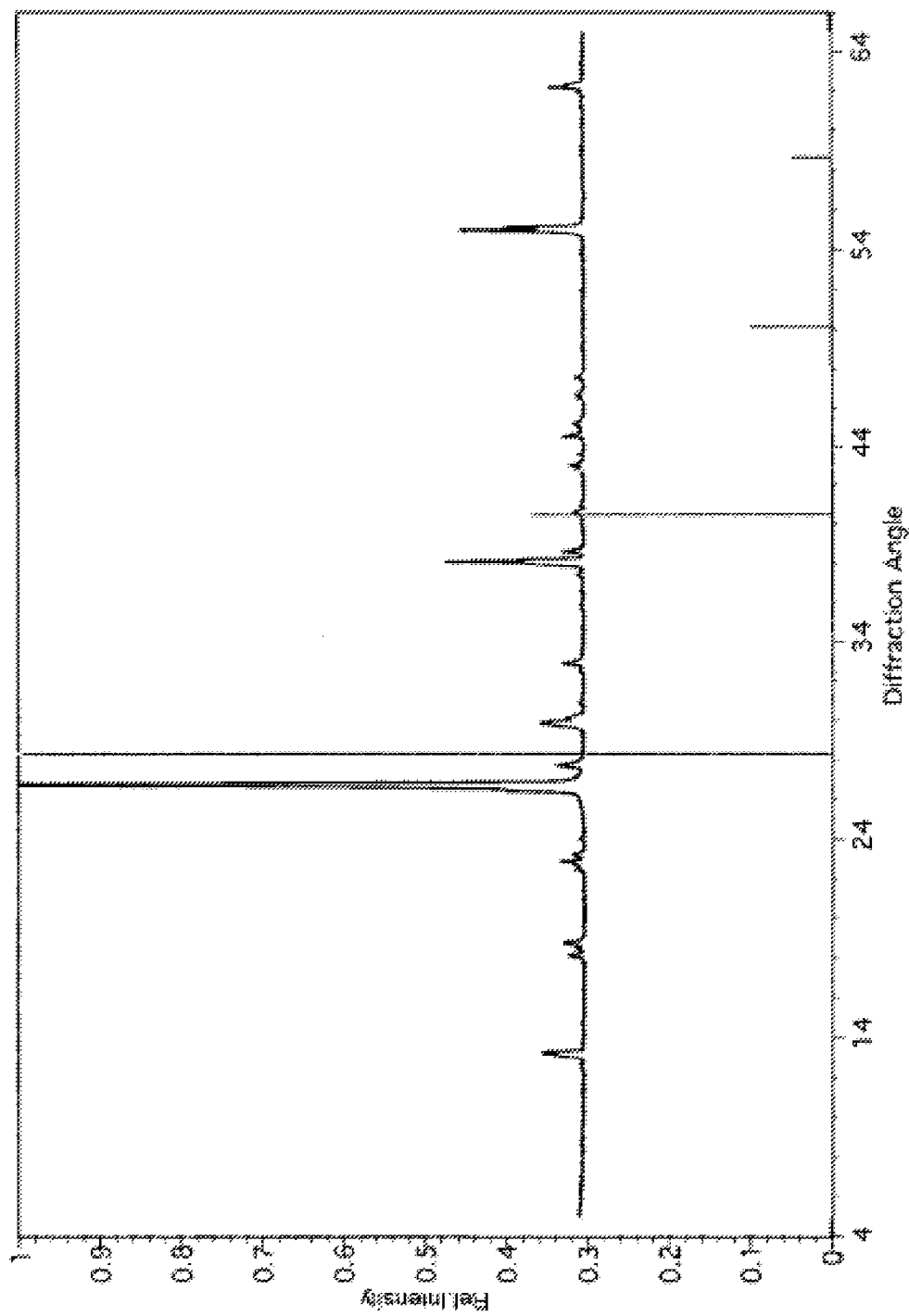
FIG. 5 illustrates the X-Ray Diffraction (XRD) pattern for a salt product having the formula $MgCl_2 \cdot xKCl \cdot yNH_4Cl \cdot zH_2O$, wherein x is about 0.25, y is about 0.75 and z is about 6, with a stick pattern reference for KCl.
Figure 6:
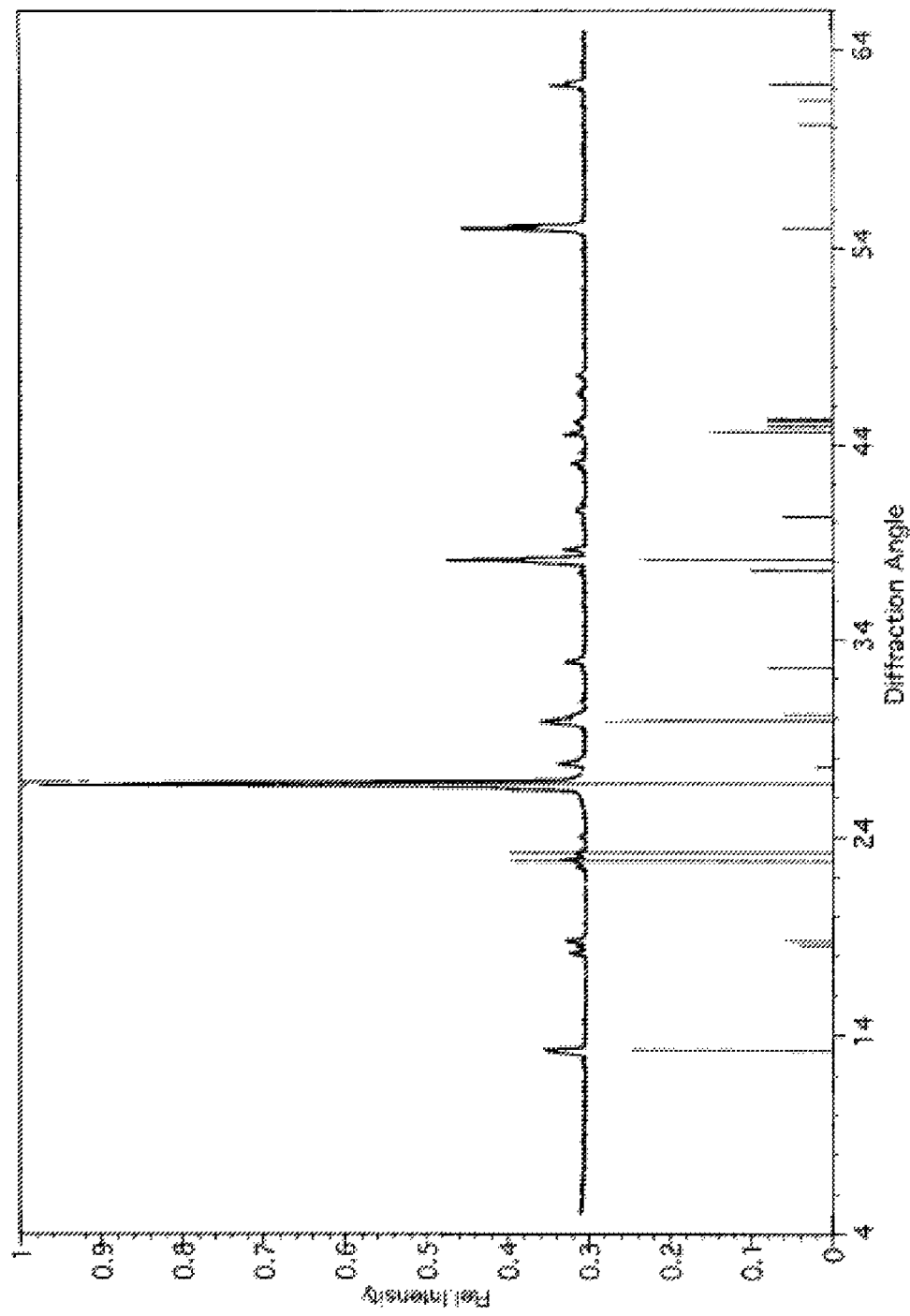
FIG. 6 illustrates the X-Ray Diffraction (XRD) pattern for a salt product having the formula $MgCl_2 \cdot xKCl \cdot yNH_4Cl \cdot zH_2O$, wherein x is about 0.25, y is about 0.75 and z is about 6, with a stick pattern reference for $Na_4MgCl_3 \cdot 6H_2O$.

X-Ray Diffraction (XRD) patterns were obtained for salts described herein. FIG. 1 illustrates the XRD pattern for Sample 1, which is an MgCl$_2$xNH$_4$Cl.6H$_2$O sample prepared by concentration in a rotary evaporator and filtration (85% yield); the XRD pattern for Sample 2, which is an MgCl$_2$×0.75 NH$_4$Cl×0.25 KCl.6H$_2$O sample by the total evaporation of solvent (~100% yield); and a stick pattern for reference NH$_4$MgCl$_3$. Similarly, XRD patterns of salt products provided herein according to Formula I, wherein x is about 0.25, y is about 0.75, z is about 6, and g is about 3, were compared to and found to be distinct from KMgCl$_3$.6H$_2$O (FIG. 2), MgCl$_2$ (FIG. 3), NHCl$_4$ (FIG. 4), KCl (FIG. 5) and NH$_4$MgCl$_3$.6H$_2$O (FIG. 6). In some embodiments, provided herein is a sample comprising (1) one or more peak having a 2θ value that is approximately equal to that of a MgCl$_2$×0.75 NH$_4$Cl×0.25 KCl.6H$_2$O pattern of any of FIGS. 1-5; (2) substantially free of one or more peak having a 2θ value that is approximately equal to that found in the stick figures (in any of FIGS. 1-6) of any of KMgCl$_3$.6H$_2$O, MgCl$_2$, NHCl$_4$, KCl, NH$_4$MgCl$_3$.6H$_2$O or a combination thereof; 3) a peak intensity ratio of a first peak having a first 2θ to a second peak having a second 2θ that is different from a peak intensity ratio of any one or more of KMgCl$_3$.6H$_2$O, MgCl$_2$, NHCl$_4$, KCl, NH$_4$MgCl$_3$.6H$_2$O having a pair of peaks with similar or identical 2θ values (e.g., as set forth in the stick figures of any of FIGS. 1-6); or a combination thereof. In some embodiments, the relative intensities of one or more peaks when comparing a salt provided herein to one or more of KMgCl$_3$.6H$_2$O, MgCl$_2$, NHCl$_4$, KCl, NH$_4$MgCl$_3$.6H$_2$O are different.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A substantially non-hygroscopic carnallite triple salt for use in a food product having the formula:

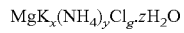  Formula III wherein the sum of x and y is about 1, wherein 0<x<1, wherein 0<y<1, wherein g is about 3, wherein z is about 4-6, and wherein the triple salt for use in a food product is substantially non-hygroscopic and substantially free of hydrogen chloride.

2. The substantially non-hygroscopic carnallite triple salt of claim 1, wherein x is about 0.05 to about 0.45 and y is about 0.55 to about 0.95.

3. The substantially non-hygroscopic carnallite triple salt of claim 2, wherein x is about 0.25 and y is about 0.75.

4. The substantially non-hygroscopic carnallite triple salt of claim 1, wherein x is about 0.55 to about 0.95 and y is about 0.05 to about 0.45.

5. The carnallite triple salt for use in a food product of claim 1, wherein z is 6.

6. The substantially non-hygroscopic carnallite triple salt for use in a food product of claim 1, wherein the triple salt is prepared by:
   a) dissolving in an aqueous medium (i) magnesium chloride, (ii) a combination of ammonium chloride and potassium chloride, and (iii) an acid scavenger in an amount suitable to maintain a pH of 5.5 to 7; and
   b) removing the aqueous medium by evaporation to afford the food triple salt product.

7. The carnallite triple salt for use in a food product of claim 6, wherein the aqueous medium is partially evaporated, thereby precipitating the carnallite triple salt.

8. The carnallite triple salt for use in food products of claim 6, wherein step (a) comprises dissolving in the aqueous medium an acid scavenger comprising about 1-10 mol % of ammonium chloride.

9. The carnallite triple salt for use in food products of claim 6, wherein the acid scavenger is not ammonia.

10. A particle comprising a core and at least one layer, wherein the core comprises a triple salt of claim 1, and wherein at least one layer of the particle comprises sodium chloride, potassium chloride, or a combination thereof.

11. A composition comprising (i) a salt for use in a food product of claim 1; and (ii) sodium chloride, potassium chloride, or a combination thereof.

12. A composition comprising (i) a salt for use in a food product of claim 1; and (ii) an aqueous medium, wherein the salt is dissolved and dissociated in the aqueous medium.

13. A nutrient substance, a semi-finished food product, a flavoring product, a processed food product that has, during the preparation thereof, been processed or preserved with a salt of claim 1.

14. The nutrient substance, semi-finished food product, or processed food product of claim 13, wherein the processed food product is selected from meats, fish, vegetables, snack foods, soups, sauces, dairy products, and yeast based products.

15. A method of decreasing the sodium content of a food product by at least partially substituting a sodium containing salt in the food product with a salt for use in a food product of claim 1, wherein the food product does not have a substantially decreased taste or shelf-life.

16. A method of preparing a substantially non-hygroscopic triple salt for use in a food product having the formula:

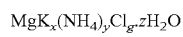  Formula III comprising:
   a) dissolving in an aqueous medium (i) magnesium chloride, (ii) a combination of ammonium chloride and potassium chloride and (iii) an acid scavenger in an amount suitable to maintain a pH of 5.5 to 7;
   b) removing the aqueous medium by evaporation to afford the food salt product;
wherein the sum of x and y is about 1, wherein: i) x is about 0.05 to about 0.45, and y is about 0.55 to about 0.95; or ii) x is about 0.55 to about 0.95 and y is about 0.05 to about 0.45; wherein g is about 3, wherein z is about 4-6, and wherein the triple salt for use in a food product is substantially non-hygroscopic and substantially free of hydrogen chloride.

17. A substantially non-hygroscopic carnallite triple salt for use in a food product having the formula:

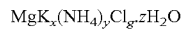  Formula III wherein the sum of x and y is about 1, wherein 0<x<1, wherein 0<y<1, wherein g is about 3, wherein z is about 4-6;
wherein less than about 5% of the K ions in the salt for use in a food product are optionally substituted with a physiologically acceptable cation;
wherein less than about 5% of the NH4 ions in the salt for use in a food product are optionally substituted with a physiologically acceptable cation;

wherein less than about 5% of the Cl ions in the salt for use in a food product are optionally substituted with a physiologically acceptable anion, and wherein the triple salt for use in a food product is substantially non-hygroscopic.

* * * * *